US009836071B2

(12) United States Patent
Atkinson et al.

(10) Patent No.: US 9,836,071 B2
(45) Date of Patent: Dec. 5, 2017

(54) APPARATUS FOR MULTIPLE-INPUT POWER ARCHITECTURE FOR ELECTRONIC CIRCUITRY AND ASSOCIATED METHODS

(71) Applicant: Silicon Laboratories Inc., Austin, TX (US)

(72) Inventors: Nicholas M. Atkinson, Austin, TX (US); Praveen Kallam, Austin, TX (US); Timothy T. Rueger, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 14/983,420

(22) Filed: Dec. 29, 2015

(65) Prior Publication Data

US 2017/0185094 A1 Jun. 29, 2017

(51) Int. Cl.
| | |
|---|---|
| *H03L 5/00* | (2006.01) |
| *G05F 1/59* | (2006.01) |
| *H02J 7/00* | (2006.01) |
| *G06F 1/32* | (2006.01) |

(52) U.S. Cl.
CPC .............. *G05F 1/59* (2013.01); *G06F 1/3243* (2013.01); *H02J 7/0052* (2013.01)

(58) Field of Classification Search
None
See application file for complete search history.

(56) References Cited

U.S. PATENT DOCUMENTS

| | | | |
|---|---|---|---|
| 5,336,986 | A | 8/1994 | Allman |
| 5,373,225 | A | 12/1994 | Poletto et al. |
| 5,592,072 | A | 1/1997 | Brown |
| 6,177,785 | B1 | 1/2001 | Lee |
| 6,703,815 | B2 | 3/2004 | Biagi |
| 6,759,836 | B1 | 7/2004 | Black, Jr. |
| 7,038,434 | B1 | 5/2006 | Brekelmans et al. |
| 8,089,822 | B1 | 1/2012 | Chankya et al. |
| 8,786,357 | B1 | 7/2014 | Wright |
| 2003/0214275 | A1 | 11/2003 | Biagi |
| 2012/0054511 | A1* | 3/2012 | Brinks ...................... G06F 1/26 713/310 |
| 2012/0286135 | A1 | 11/2012 | Gong et al. |
| 2014/0075218 | A1* | 3/2014 | Bartling .............. G06F 11/1469 713/320 |

(Continued)

OTHER PUBLICATIONS

U.S. Appl. No. 14/983,413, filed Dec. 2015, Rueger et al.

(Continued)

*Primary Examiner* — Lincoln Donovan
*Assistant Examiner* — Khareem E Almo
(74) *Attorney, Agent, or Firm* — Law Offices of Maximilian R. Peterson

(57) ABSTRACT

An apparatus includes an integrated circuit (IC). The IC includes a power controller, which includes a regulator and a controller. The regulator receives a plurality of input voltages and provides a regulated output voltage. The controller controls the regulator to generate the regulated output voltage from the plurality of input voltages. The power controller provides power to a load integrated in the IC from a set of arbitrary input voltages. The set of arbitrary input voltages includes the plurality of input voltages.

19 Claims, 21 Drawing Sheets

(56) References Cited

U.S. PATENT DOCUMENTS

2016/0116925 A1* 4/2016 Freeman ........... H02M 3/33546
307/130

OTHER PUBLICATIONS

DS1236, MicroManager Chip, 2007, 19 pgs.
LM2935, Low Dropout Dual Voltage Regulator, 1996, 8 pgs.
Micropower SOT-23, 120mA Low-Dropout Voltage Regulator On/Off Switch, date unknown but before the filed of the present application, 3 pgs.
DS1831C/D/E 3.3V/2.5V Multisupply MicroMonitor, 2003, 15 pgs.
EZ1087, 5.0 Amp Remote Sense Voltage Regulator, 1998, 5 pgs.
300MA Ultra Low Dropout Positive Adjustable and Fixed Regulators, 2005, 7 pgs.
Single Hot-Swap Power Controllers with Circuit Breaker and Power-Good Reporting, 2006, 25 pgs.
TLC1422 How Swap Controller, 1997, 16 pgs.
Integrated Power Management Unit Top Specification, 2010, 96 pgs.
+5V/Programmable Low-Dropout Voltage Regulator, 1994, 8 pgs.

* cited by examiner

APPARATUS FOR MULTIPLE-INPUT POWER ARCHITECTURE FOR ELECTRONIC CIRCUITRY AND ASSOCIATED METHODS

CROSS-REFERENCE TO RELATED APPLICATIONS

This application is related to, and incorporates by reference in its entirety for all purposes, U.S. patent application Ser. No. 14/983,413, filed on Dec. 29, 2015, titled "Apparatus for Power Regulator with Multiple Inputs and Associated Methods".

TECHNICAL FIELD

The disclosure relates generally to power conversion apparatus and method. More particularly, the disclosure pertains to apparatus for providing regulated power from multiple sources, and associated methods.

BACKGROUND

With advances in technology, an increasing number of circuit elements have been integrated into devices, such as integrated circuits (ICs). Furthermore, a growing number of devices, such as ICs, or subsystems, have been integrated into products. With developments such as the Internet of Things (IoT), portable or mobile products, such as cellular phones, smart phones, and the like, this trend is expected to continue.

The growing number of circuit elements, devices, subsystems, etc., has also resulted in a corresponding complexity of the type of power architectures used in the products that include such components. In some applications, products operate from a variety of types of power, such as battery power, AC mains, or other sources. Typically, a regulator is used to provide power for the product from a single an input voltage, and is not optimized to supply the appropriate output current for various mode of operation, i.e., it has less efficiency in one or more modes of operation (with corresponding output current) than in the mode (with the corresponding output current) for which it is designed to supply power. In other words, it has too much current overhead to be a practical, efficient source of regulated power in various modes of operation corresponding to a relatively large range of output current.

The description in this section and any corresponding figure(s) are included as background information materials. The materials in this section should not be considered as an admission that such materials constitute prior art to the present patent application.

SUMMARY

A variety of apparatus and associated methods for power supply architectures and schemes are contemplated. According to one exemplary embodiment, an apparatus includes an integrated circuit (IC). The IC includes a power controller, which includes a regulator and a controller. The regulator receives a plurality of input voltages and provides a regulated output voltage. The controller controls the regulator to generate the regulated output voltage from the plurality of input voltages. The power controller provides power to a load integrated in the IC from a set of arbitrary input voltages. The set of arbitrary input voltages includes the plurality of input voltages.

According to another exemplary embodiment, an apparatus includes an MCU, which includes a power controller. The power controller includes a regulator that receives a plurality of input voltages and provides a regulated output voltage. The power controller further includes a controller to control the regulator to generate the regulated output voltage from the plurality of input voltages. The power controller sequences provision of power to circuitry in the MCU to power up a core circuit of the MCU.

According to another exemplary embodiment, a method of providing power to circuitry in an IC includes receiving a plurality of input voltages in a regulator, and controlling the regulator to generate the regulated output voltage from the plurality of input voltages. The method further includes providing power to a load integrated in the IC from a set of arbitrary input voltages, the set of arbitrary input voltages comprising the plurality of input voltages.

BRIEF DESCRIPTION OF THE DRAWINGS

The appended drawings illustrate only exemplary embodiments and therefore should not be considered as limiting the scope of the application or the claims. Persons of ordinary skill in the art appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to power architecture circuitry in electronic apparatus, including circuitry and associated methods for providing regulated power using multiple input or power sources according to various schemes. Exemplary embodiments provide apparatus and associated methods for providing regulated power from multiple sources to one or more loads according to one or more power provision schemes or profiles, including the sequencing of one or more voltages for providing power, sequencing and provision of control signals to various blocks of circuitry, etc., as described below in detail.

Figure 1:
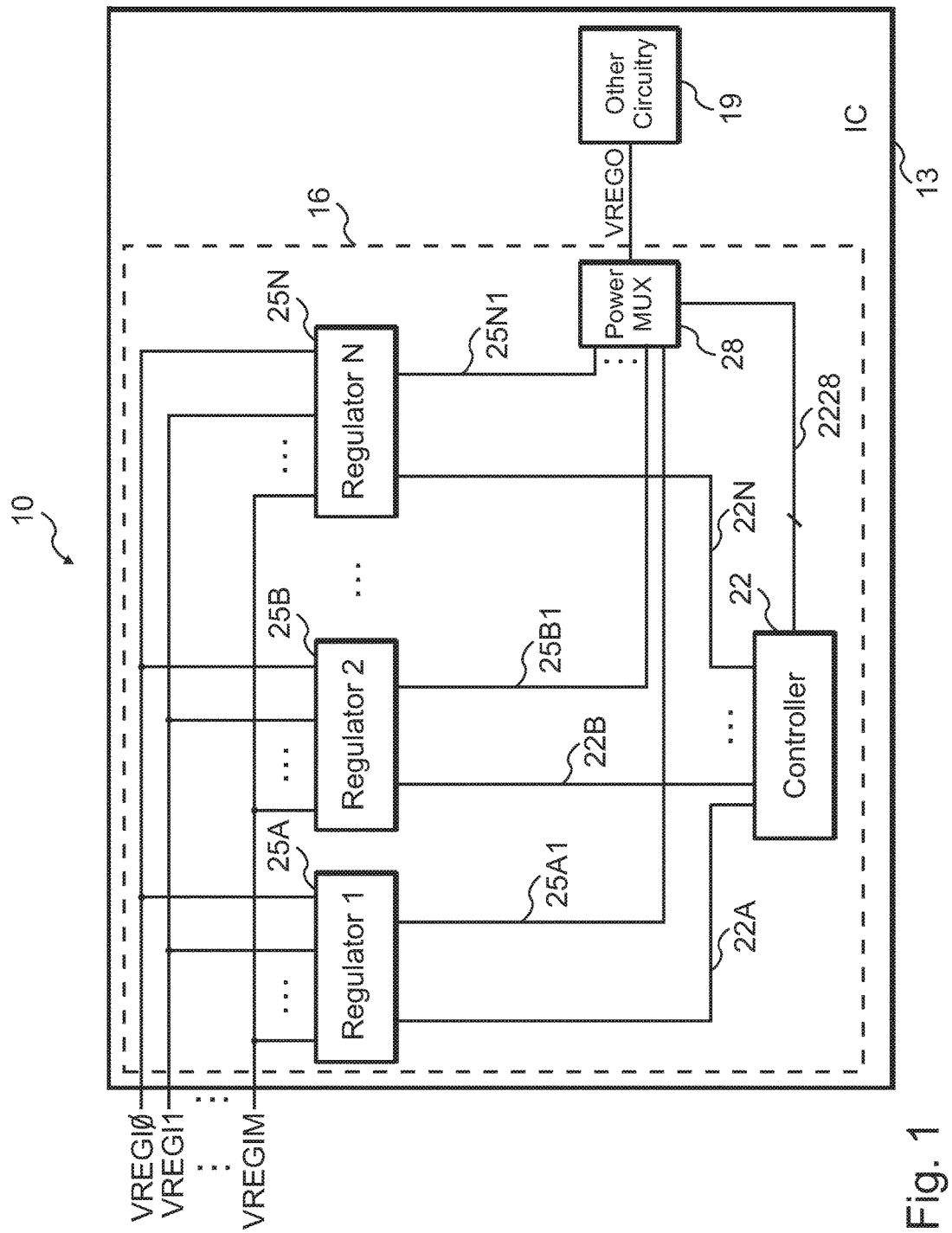
FIG. 1 illustrates a circuit arrangement for providing power from multiple input sources according to an exemplary embodiment.

One aspect of the disclosure relates to providing power, such as via a regulated voltage, to a load or circuit or set of circuit, from multiple input sources (e.g., multiple input voltages or voltage sources). FIG. 1 illustrates a circuit arrangement 10 for doing so according to an exemplary embodiment.

Circuit arrangement 10 includes an integrated circuit (IC) 13. IC 13 includes a regulator or regulator circuit or power converter 16. Regulator 16 receives power from a set of inputs. In the example shown, the inputs constitute a set of M input voltages VREGI0 through VREGIM. Regulator 16 provides a regulated output voltage VREGO to a load or circuit, labeled "other circuitry" 19 in FIG. 1.

Regulator 16 includes a set of N voltage regulators 25A-25N. Voltage regulators 25A-25N receive the set of M input voltages VREGI0-VREGIM. Voltage regulators 25A-25N provide a respective set of regulated output voltages 25A1-25N1 to power multiplexer (MUX) 28.

Power MUX 28 provides power multiplexing or multiplexes power, such as voltages 25A1-25N1. In response to a set of select signals provided via link 2228 from a controller 22, power MUX 28 provides one of voltages 25A1-25N1 as its output voltage. In other words, under the control of controller 22, power MUX 28 provides one of voltages 25A1-25N1 as a regulated output voltage VREGO to other circuitry 19.

Regulators 25A-25N operate under the control or supervision of controller 22. Controller 22 is coupled to regulators 25A-25N via links 22A-22N, respectively. Via links 22A-22N, controller 22 provides control information or signals to regulators 25A-25N. Controller 22 controls one or more aspects of the operation of voltage regulators 25A-25N. As noted, voltage regulators 25A-25B are coupled to a set of M input voltages VREGI0-VREGIM. Under the control of controller 22, a voltage regulator in the set of voltage regulator 25A-25N regulates one of input voltages VREGI0-VREGIM to provide regulated output voltage VREGO to other circuitry 19. In this manner, voltage regulators 25A-25N and, thus, regulator 16, receive multiple input voltages VREGI0-VREGIM and provide a regulated output voltage VREGO.

The type of control by controller 22 depends on a number of factors, such as the type of regulators used, the type of load (other circuitry 19), available technology, cost, complexity, design and/or performance specifications, and the like. Examples of variables or parameters controlled by controller 22 include output voltage level(s) of one or more of voltage regulators 25A-25N, output current level(s) (e.g., current limit) of one or more of voltage regulators 25A-25N, degree of regulation of output voltage(s) of one or more of voltage regulators 25A-25N, etc.

In some embodiments, controller 22 receives status information from one or more of voltage regulators 25A-25N via links 22A-22N. The type and number of status information, such as signals, depends on a number of factors, such as the type of regulators used, the type of load (other circuitry 19), available technology, cost, complexity, design and/or performance specifications, and the like. Examples of status signals or information include the actual output voltage level(s) of one or more of voltage regulators 25A-25N, the actual output current level(s) of one or more of voltage regulators 25A-25N, power dissipation or temperature levels of one or more of voltage regulators 25A-25N, etc.

In exemplary embodiments, such as the embodiment in FIG. 1, a variety of circuitry may be included in other circuitry 19. Other circuitry 19 may include a variety of circuits, devices, subsystems, systems, blocks of transistors, circuit blocks, and the like, as desired, and as persons of ordinary skill in the art will understand. The quality and quantity of circuitry in other circuitry 19 depends on factors such as the desired or specified functionality for other circuitry 19 and/or IC 13 (or other system, subsystem, block(s) of circuitry external to IC 13), as persons of ordinary skill in the art will understand.

Examples of analog or mixed-signal circuitry in other circuitry 19 include bias circuits, decoupling circuits, coupling circuits, supply circuits, current mirrors, current and/or voltage sources, filters, amplifiers, converters (e.g., analog-to-digital converters (ADCs) and digital-to-analog converters (DACs)), signal processing circuits (e.g., multipliers), detectors, and the like. Examples of digital circuitry in other circuitry 19 includes combinational logic (e.g., logic gates, adders, subtracters, multipliers), sequential logic (flip-flops, latches), standard cell or custom logic circuits, etc. Examples of digital functional blocks that might be included in other circuitry 19 include processors, central-processing units (CPUs), MCU blocks/circuits/subsystems, arithmetic-logic units (ALUs), digital signal processors (DSPs) or circuitry to implement DSP functions, such as filters, delay blocks, and the like, as desired.

In exemplary embodiments, controller 22 may include a variety of types and blocks of circuitry. In some embodiments, controller may include logic circuitry (combinational and/or sequential logic), finite-state machines (FSMs), processor circuits, or other circuitry to perform a variety of operations, such as the operations described above.

Furthermore, the functionality of controller 22 may be performed in a variety of ways. In some embodiments, specialized or special-purpose hardware may be used to implement the functionality of controller 22. In some embodiments, software running on general-purpose or special-purpose hardware may be used. In some embodiments, firmware (e.g., firmware running on hardware within an MCU) may be used. Combinations of the foregoing techniques may also be used in some embodiments to implement the functionality of controller 22.

As noted above, links 22A-22N and 2228 are used to communicate information, such as control information/signals, status information/signals, etc. In exemplary embodiments, links 22A-22N and 2228 may constitute a coupling mechanism, such as a bus, a set of conductors or semiconductors or traces in an IC, and the like.

Although regulator 16 generally, and voltage regulators 25A-25N specifically, are described above as voltage regulators, other types/configurations of regulators may be used. Examples of other types of regulators include current regulators (generating a regulated output current from an input voltage/current), voltage and current regulators (generating regulated output current and output voltage from an input voltage/current), etc. In some embodiments, one or more of voltage regulators 25A-25N constitutes a low dropout (LDO) voltage regulator (e.g., less than 300 mV dropout voltage). Generally, the choice of the type and/or quantity of regulators depends on factors such as design and performance specifications (e.g., the type of circuits in other circuitry 19), cost, complexity, available technology, etc.

Figure 2:
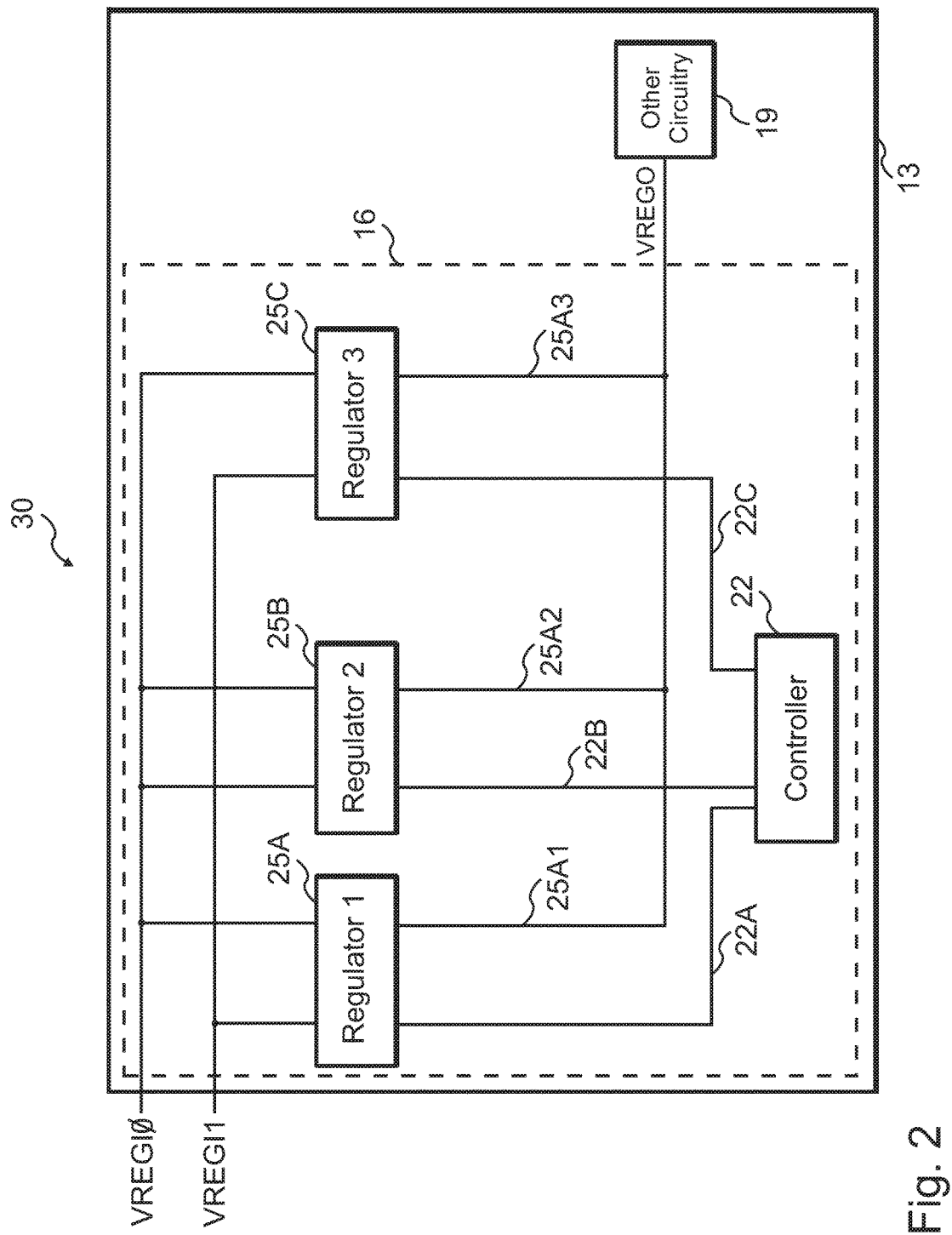
FIG. 2 depicts a circuit arrangement for providing power from multiple input sources according to another exemplary embodiment.

A variety of alternative embodiments to circuit arrangement 10 in FIG. 1 are contemplated. Some of the alternative embodiments are described below. FIG. 2 depicts a circuit arrangement 30 for providing power from multiple input sources according to another exemplary embodiment. Circuit arrangement 30 is similar to circuit arrangement 10 (see FIG. 1). Rather than using M input voltages, however, regulator 16 receives two input voltages, labeled VREGI0 and VREGI1, and furthermore uses three voltage regulators, labeled 25A-25C, respectively. As persons of ordinary skill in the art will understand, however, other numbers (rather than two) of input voltages and/or other numbers (rather than three) voltage regulators may be used in other embodiments, as desired.

Voltage regulators 25A-25C provide different levels of output current that, for example, may correspond to corresponding modes of operation of IC 13. As an example, voltage regulator 25A may provide a relatively high level of output current, corresponding to a relatively high drain (HD) by a load, such as other circuitry 19. Thus, voltage regulator 25A corresponds to an HD mode or is an HD LDO voltage regulator, and provides a relatively high output current (e.g., 200 mA) to other circuitry 19 in an exemplary embodiment.

Voltage regulators 25B-25C provide progressively smaller levels of output current. More specifically, voltage regulator 25B provides a lower output current than does voltage regulator 25A. The lower output current may correspond to a low drain (LD) by a load, such as other circuitry 19. Thus, voltage regulator 25B corresponds to an LD mode or is an LD LDO voltage regulator, and provides a relatively low output current (e.g., 200 nA) to other circuitry 19 in an exemplary embodiment. Voltage regulator 25C provides an even lower output current than does voltage regulator 25B. The lower output current may correspond to an ultra-low drain (ULD) by a load, such as other circuitry 19. Thus, voltage regulator 25C corresponds to an ULD mode or is an ULD LDO voltage regulator, and provides a relatively low output current (e.g., 20 nA) to other circuitry 19 in an exemplary embodiment.

The modes of operation of regulator 16 (i.e., the HD, LD, and ULD modes corresponding to voltage regulators 25A-25C, respectively) may correspond to the modes of operation of IC 13 generally, or to the modes of operation of other circuitry 19 specifically. For example, in some embodiments, IC 13 may include an Advanced RISC Machines (ARM) processor (e.g., other circuitry 19 includes an ARM processor). In such an embodiment, the HD, LD, and ULD modes of operation correspond to normal (full performance, or "Energy Mode 0"), low-power (lower performance (e.g., lower clock rate and/or fewer enabled or active peripherals), or "Energy Mode 2"), and ultra low power or deep sleep mode (processor not running, but enough power supplied to the memory to retain its contents, or "Energy Mode 4") of the ARM processor, respectively.

By using one of voltage regulators 25A-25C whose output current level is appropriate for (or optimized for) a given mode of operation, efficiency of operation (e.g., power consumption, low-power operation, etc.) is improved. Improved efficiency in turn allows mobile operation (as described, for example, in connection with FIG. 3), longer operation, less energy use, less cost, less heat generation, etc.

Referring to FIG. 2, circuit arrangement 30 also omits the power MUX. More specifically, rather than using a power MUX, outputs 25A1-25N1 of voltage regulators 25A-25N are coupled together to provide regulated voltage VREGO. In the embodiment shown, the coupling of outputs 25A1-25N1 by tying the outputs together results in an effective "dot" or wired-OR connection. Thus, by enabling one of voltage regulators 25A-25N to drive VREGO, that particular voltage regulator regulates the input voltage (VREGI0 or VREGI1) to generate regulated output voltage VREGO).

Figure 3:
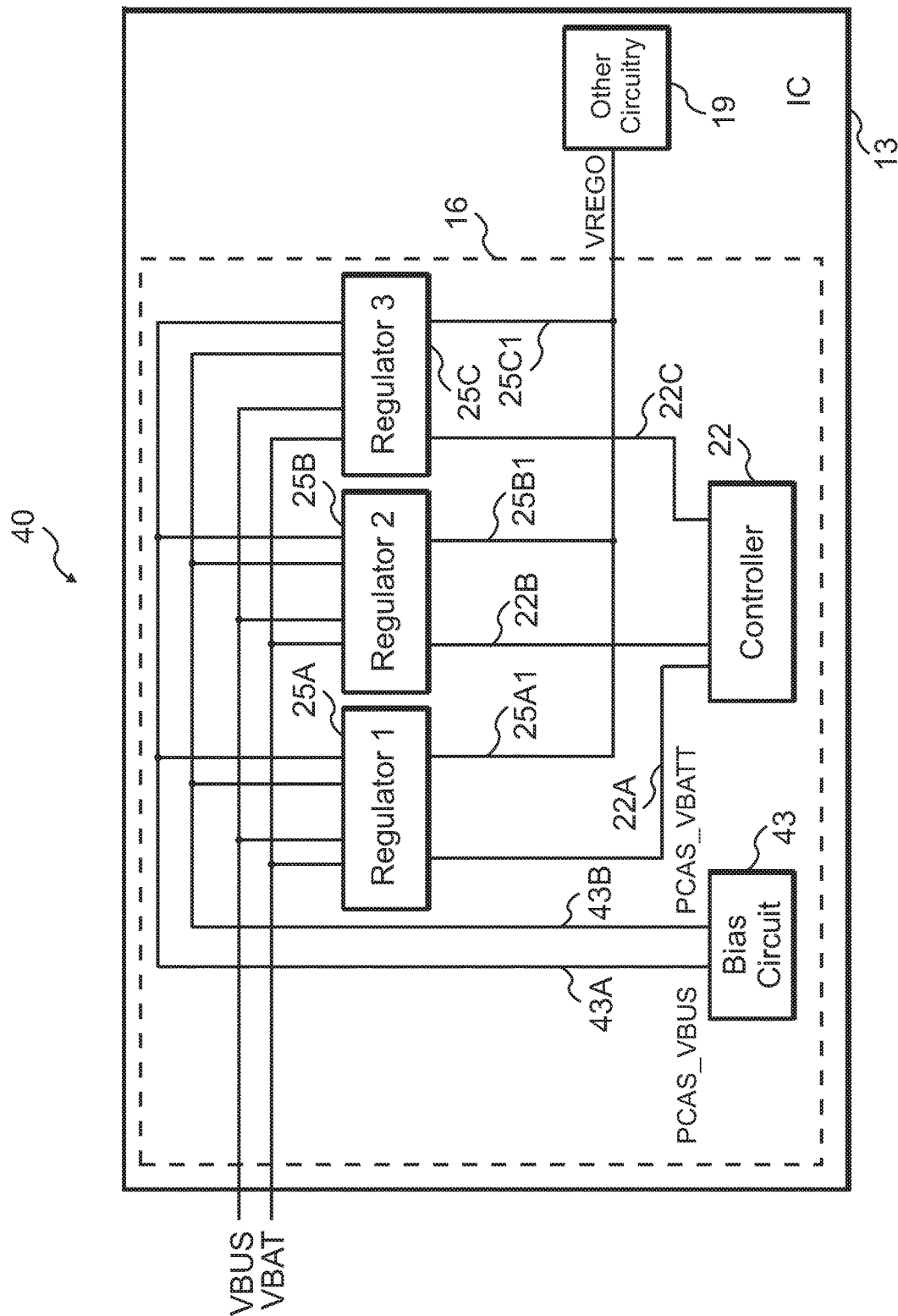
FIG. 3 shows a circuit arrangement for providing power from multiple input sources according to another exemplary embodiment.

FIG. 3 shows a circuit arrangement 40 for providing power from multiple input sources according to another exemplary embodiment. Circuit arrangement 40 is similar to circuit arrangement 30 (see FIG. 2). Rather than using M input voltages, however, regulator 16 receives two input voltages, labeled VBUS and VBATT (rather than VREGI0 and VREGI1), and furthermore uses three voltage regulators, labeled 25A-25C, respectively. Voltages VBUS and VBATT constitute two input voltage sources. Voltage VBUS refers to a bus having a specified voltage, such as a universal serial bus (USB) with a 5-volt (5 V) voltage. Voltage VBATT refers to a battery voltage (e.g., 4.2 V), i.e., a battery external to IC 13 that provides the voltage to regulator 16. Voltage regulators 25A-25C regulate the VBUS or VBATT voltages to provide regulated output voltage VREGO, which may have a desired voltage, such as 3.3 V. As persons of ordinary skill in the art will understand, however, other numbers (rather than two) of input voltages and/or other numbers (rather than three) voltage regulators may be used in other embodiments, as desired.

Other circuitry 19 may constitute mobile equipment, such a cellular telephone. In this situation, other circuitry 19 may include some or all of the devices and/or circuitry in the telephone. Examines include DSPs, MCUs, audio circuitry and devices, video or graphics circuitry or devices, including touch-screens, control circuitry, interface circuitry, keypads, and the like. A battery voltage (VBATT) and another external power source (VBUS, etc.) constitute two input voltages to IC 13. IC 13 uses regulator 16 to regulate the input voltages and provide regulated voltage VREGO to various part of other circuitry 19, such as those described above. Depending on various modes of operation of other circuitry 19 (or parts of other circuitry 19) and/or IC 13, one of voltage regulators 25A-25C provides regulated voltage VREGO.

Referring again to FIG. 3, circuit arrangement 40 further includes provisions for protecting transistors in various circuit blocks, such as in one or more of voltage regulators 25A-25C. Consider as an example the situation described with respect to the exemplary embodiment where VBUS has a 5-volt level. Suppose that, because of various reasons, such as the particular semiconductor technology available for the fabrication of IC 13, transistors used in one or more of voltage regulators 25A-25C cannot withstand the VBUS voltage level. More specifically, suppose that voltage regulators 25A-25C use 3-volt transistors (e.g., metal oxide semiconductor (MOS) field effect transistors (FETs), or MOSFETs) that can withstand a maximum of 3 volts, for example as a maximum drain-to-source voltage ($V_{DS}$). For various reasons, such as cost and/or chip area, IC 13 includes transistors two types of transistors, say, one type of transistor with a maximum $V_{DS}$ of one volt (or 1 V), and another type of transistor with a maximum $V_{DS}$ of 3 volts.

In such a situation, one or more of voltage regulators 25A-25C (specifically, any that use 3-volt transistors) may use a cascode configuration (described below in more detail) as opposed to a single transistor. The cascode configuration uses two transistors, one of which provides the functionality of the single transistor that the cascode configuration replaces, e.g., the pass transistor in an LDO voltage regulator that is controlled by controller 22 or other control circuitry. The other transistor in the cascode configuration is usually biased with an appropriate gate voltage. Bias circuit 43 provides the appropriate bias voltage(s) for the cascode configuration.

More specifically, bias circuit 43 provides a cascode bias voltage PCAS_VBUS that is supplied to the cascode configurations in voltage regulator(s) 25A-25C that couple to VBUS and regulate VBUS to provide regulated voltage VREGO. Bias circuit 43 also provides a cascode bias voltage PCAS_VBATT that is supplied to the cascode configurations in voltage regulator(s) 25A-25C that couple to VBUS and regulate VBUS to provide regulated voltage VREGO. In some embodiments, PCAS_VBUS and PCAS_VBATT constitute fixed voltages, for example, a fixed amount (e.g., 3 V) below the supply voltage (e.g., 5 V).

Figure 4:
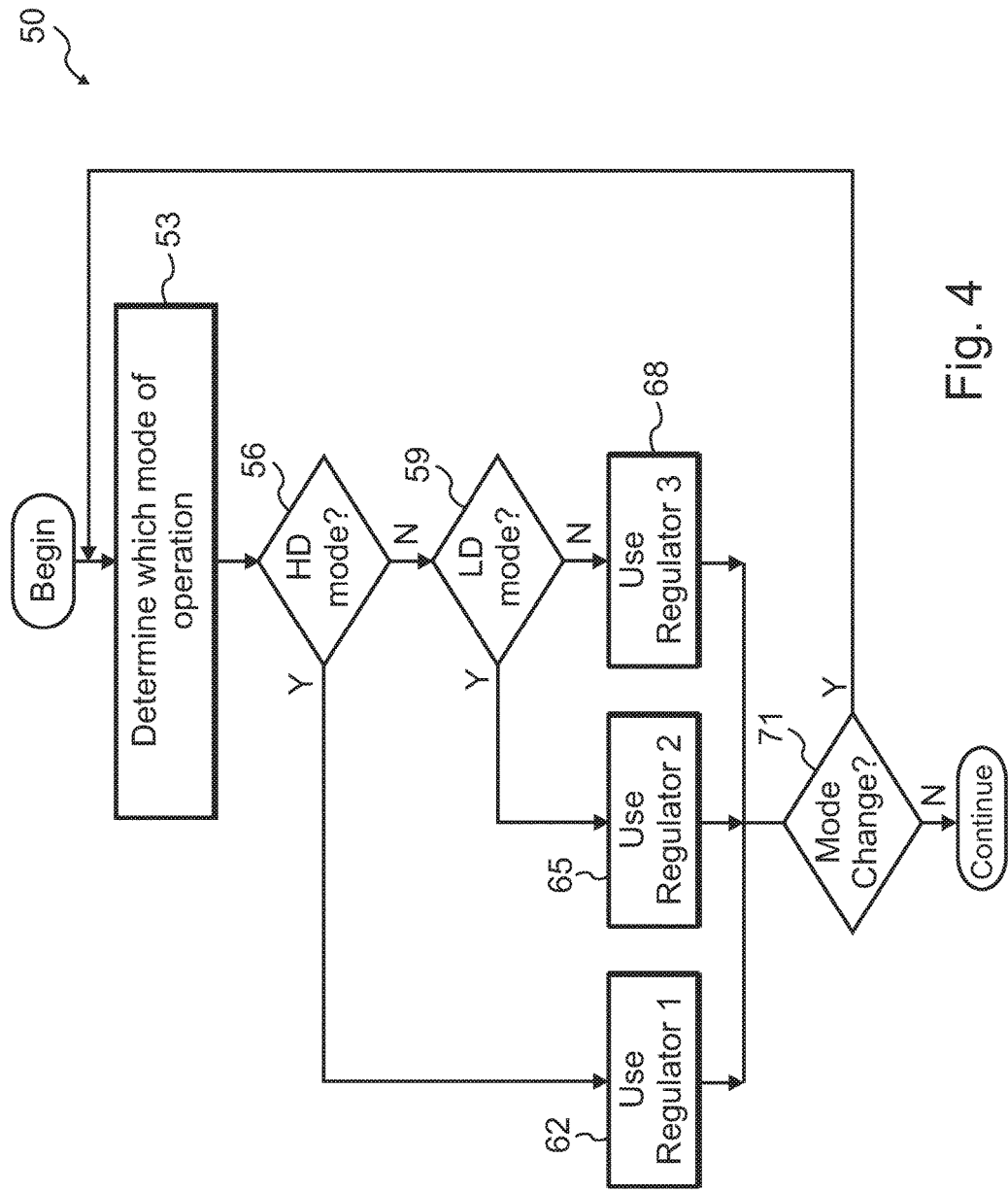
FIG. 4 depicts a flow diagram for a process of providing power from multiple input sources according to an exemplary embodiment.

FIG. 4 depicts a flow diagram 50 for a process of providing power from multiple input sources according to an exemplary embodiment. More specifically, flow diagram 50 corresponds to the circuit arrangement in FIG. 3. The disclosed concepts, however, may be extended to other numbers and/or of input voltages and/or voltage regulators (see FIGS. 1-2) by making appropriate modifications, as persons of ordinary skill in the art will understand.

Referring again to FIG. 4, at 53 the mode of operation (HD, LD, ULD, etc.) is determined. At 56, a determination is made whether HD operation is desired. If so, at 62, the voltage regulator (25A, regulator 1) corresponding to the HD mode of operation is used or enabled or activated. If not, at 59 a determination is made whether LD operation is desired. If so, at 65, the voltage regulator (25B, regulator 2) corresponding to the LD mode of operation is used or enabled or activated. If not, at 68 the voltage regulator (25C, regulator 3) corresponding to the ULD mode of operation is used or enabled or activated.

At 71, a determination is made whether a change in the mode of operation is desired. The change in the mode of operation may be caused or desired by a variety of sources. For example, an interrupt may cause a processor to resume from an LD or ULD mode, a user of IC 13 may take an action that causes a mode change (e.g., from LD or ULD to HD), etc. If a change in the mode of operation is desired or caused, control returns to 53 to determine which mode of operation should be used (in place of the existing mode of operation, i.e., the mode enabled or used or activated at 62, 65, or 68). Otherwise, processing continues. As an alternative, in some embodiments, control might return to 71 to await an indication that a change in the mode of operation is desired.

Figure 5:
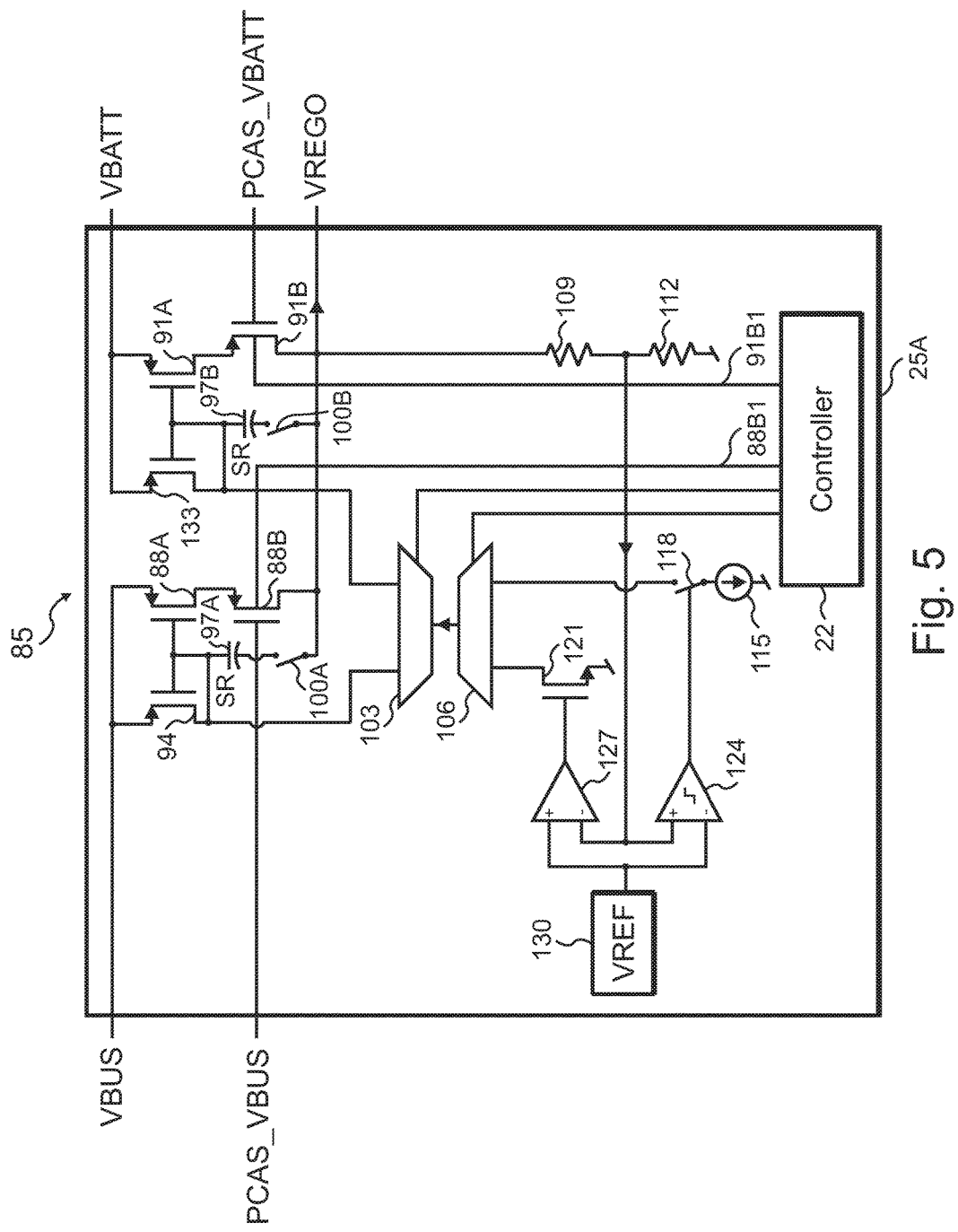
FIG. 5 illustrates a circuit arrangement for a multiple-input regulator according to an exemplary embodiment.
Figure 6:
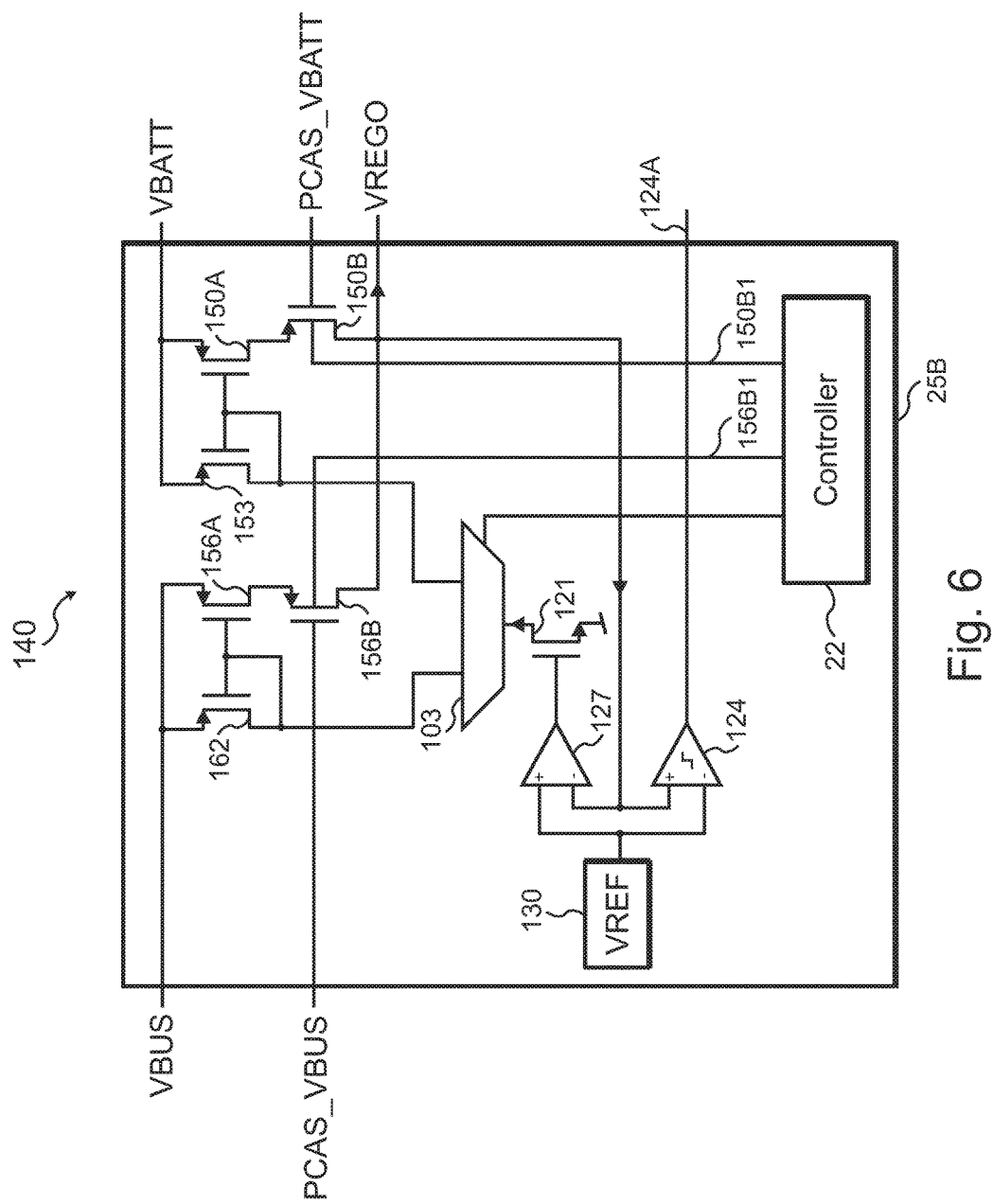
FIG. 6 depicts a circuit arrangement for a multiple-input regulator according to another exemplary embodiment.
Figure 7:
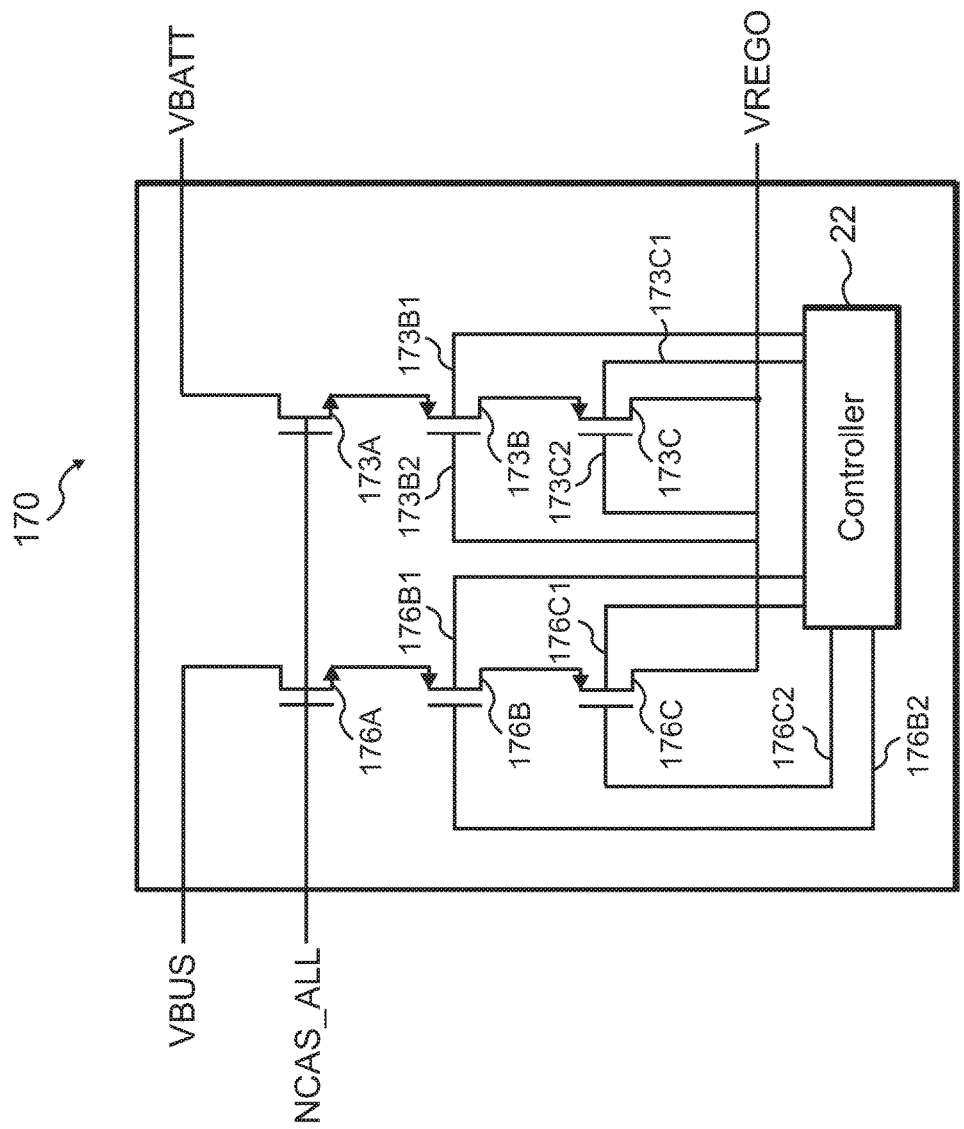
FIG. 7 illustrates a circuit arrangement for a multiple-input regulator according to another exemplary embodiment.

One aspect of the disclosure relates to circuit arrangements for the voltage regulators in regulator 16. FIGS. 5-7 provide circuit arrangements for HD, LD, and ULD voltage regulators, described above, according to exemplary embodiments.

FIG. 5 illustrates a circuit arrangement 85 for a multiple-input HD voltage regulator according to an exemplary embodiment. Circuit arrangement 85 includes two similar (or identical) cascode configurations, including transistors 88A-88B and 91A-91B, that are coupled to receive VBUS and VBATT, respectively. By turning on and controlling transistor 88A-88B, voltage regulator 25A regulates input voltage VBUS to generate regulated output voltage VREGO. Conversely, by turning on and controlling transistor 91A-91B, voltage regulator 25A regulates input voltage VBATT to generate regulated output voltage VREGO. Circuit arrangement 85 further includes two diode-connected transistors, 94 and 133, coupled to transistors 88A and 91A, respectively. Thus, transistor 94 and transistor 88A have the same gate-to-source voltage. Similarly, transistor 133 and transistor 91A also have the same gate-to-source voltage.

The gate voltages of transistors 88A and 91A are provided via demultiplexer (DeMUX) 103 under the control of controller 22. The output signals of DeMUX 103, provided to the gate voltages of transistor 88A and 91A, correspond to regulation of either VBUS or VBATT, respectively. Thus, by using DeMUX 103, controller 22 can cause the output of error amplifier 127, as provided via transistor 121, to control transistor 88A or 91A, which correspond to regulation of either VBUS or VBATT, respectively, to provide regulated output voltage VREGO.

The input signal of DeMUX 103 is provided via MUX 106 under the control of controller 22. The input signals of MUX 106 are provided by transistor 121 and switch 118. Transistor 121 is driver by error amplifier 127. Error amplifier 127 compares a reference voltage provided by voltage source 130 (labeled "VREF") to a scaled-down version of regulated output voltage VREGO, provided by a resistor divider that includes resistor 109 and resistor 112. Thus, resistor 109, resistor 112, error amplifier 127, transistor 121, MUX 106, DeMUX 103, and either transistors 88A-88B or transistors 91A-91B constitute a negative feedback loop that regulates output voltage VREGO.

Regulation from VBUS may be turned off by raising the gate of transistor 88A to the VBUS voltage level. Regulation from VBUS may be performed by controller 22 controlling MUX 106 and DeMUX 103 so that the output voltage of error amplifier 127, provided via transistor 121, is coupled to the gate of transistor 88A. Conversely, regulation from VBATT may be turned off by raising the gate of transistor 91A to the VBATT voltage level. Regulation from VBATT may be performed by controller 22 controlling MUX 106 and DeMUX 103 so that the output voltage of error amplifier 127, provided via transistor 121, is coupled to the gate of transistor 91A. Thus, voltage regulator 25A can provide regulated output voltage VREGO from either input voltage VBUS or from input voltage VBATT.

Capacitors 97A-97B, switches 100A-100B, switch 118, current source 115, and comparator 124 are used to control the slew rate of regulated output voltage VREGO. More specifically, in a typical use scenario, regulated output voltage VREGO drives a bypass capacitor (not shown) that is often used in other circuitry 19 (not shown), a load driven by voltage regulator 25A. In order to initially charge the bypass capacitor with a limited slew rate to limit the current drawn from the selected supply, when the scaled-down version of VREGO, as provided by resistor 109 and resistor 112, is below VREF, comparator 124 causes switch 118 to close. Controller 22 (or comparator 124) also disables transistor 94 and/or transistor 133, and causes switch 100A or switch 100B to close, depending on whether regulation of VBUS or VBATT is desired (i.e., whether transistors 88A-88B or transistors 91A-91B are used to regulate VBUS or VBATT, respectively, to generate VREGO).

Current from current source 115 is routed (under the control of controller 22) via MUX 106 and DeMUX 103 to charge capacitor 97A or capacitor 97B, depending on whether regulation of VBUS or VBATT is desired. Once VREGO rises to a level such that the scaled version of it exceeds VREF, comparator 124 causes switch 118 to open, and controller 22 (or comparator 124) also causes switches 100A-100B to open. At that point, controller 22 activates the negative feedback loop that includes error amplifier 127 and transistor 121 to control transistors 94, 88A, and 88B or transistors 133, 91A, and 91B, depending on whether regulation of VBUS or VBATT is desired.

As noted above, transistor 88B and transistor 91B are used in a cascode configuration to provide protection for transistors 88A and 91A, respectively. In other words, the power path from each input voltage (VBUS and VBATT) to the output (VREGO) is made of two cascode-coupled transistors that have relatively low (e.g., 3 V) maximum operating voltages. In the embodiment shown, transistors 88A-88B and 91A-91B constitute p-channel MOSFETs. The n-well (or body or bulk) of transistors 88B and 91B are dynamically switched by controller 22, by providing signals 88B1 and 91B1, respectively. Signals 88B1 and 91B1 are switched or adjusted or controlled to have levels that prevent parasitic diode (between the source region and the body region or between the drain region and the body region) conduction when an input voltage (VBUS or VBATT) falls below the output voltage VREGO of voltage regulator 25A.

In some embodiments, if an input voltage (VBUS or VBATT) that is used to generate regulated output voltage VREGO falls below a threshold (e.g., VREGO minus the dropout voltage), controller 22 causes regulation from the other input voltage (e.g., switches from regulation from VBUS to regulation from VBATT, or vice-versa, as described above, depending on which of the two input voltages was being used to provide the output voltage). In some embodiments, voltage regulator 25A includes a bypass mode. Specifically, if both input voltages fall below the threshold (e.g., VREGO minus the dropout voltage), controller 22 causes transistors 88A-88B or transistors 91A-91B to fully turn on, thus bypassing the negative feedback control loop, and coupling the input voltage (VBUS or VBATT, depending on which is higher) to the voltage regulator output voltage. In this manner, the output voltage is provided such that it is closer to (or remains closer to for a longer period of time) the target regulator output voltage VREGO. As an alternative, rather than engaging the bypass mode automatically, the bypass mode may be engaged manually, for example, by the user of IC 13, or a by circuit (controller, processor, etc.) detecting that the VBUS and/or VBATT voltages have below the safe operating voltage of the transistors, such as 3 V in some embodiments, or a desired or given threshold. Turning on the bypass mode turns off the control loop and turns on the appropriate transistor (e.g., 88A-88B, 91A-91B, etc.) in the power path by pulling its gate to ground potential (hence the 3 V level discussed above).

FIG. 6 depicts a circuit arrangement 140 for multiple-input LD voltage regulator 25B according to another exemplary embodiment. Circuit arrangement 140 includes two similar (or identical) cascode configurations, including transistors 156A-156B and 150A-150B, that are coupled to receive VBUS and VBATT, respectively. By turning on and controlling transistor 156A-156B, voltage regulator 25B regulates input voltage VBUS to generate regulated output voltage VREGO. Conversely, by turning on and controlling transistor 150A-150B, voltage regulator 25B regulates input voltage VBATT to generate regulated output voltage VREGO. Circuit arrangement 140 further includes two diode-connected transistors, 162 and 153, coupled to transistors 156A and 150A, respectively. Thus, transistor 162 and transistor 156A have the same gate-to-source voltage. Similarly, transistor 153 and transistor 150A also have the same gate-to-source voltage.

The gate voltages of transistors 156A and 150A are provided via DeMUX 103 (similar to DeMUX 103 in FIG. 5) under the control of controller 22. Referring again to FIG. 6, the output signals of DeMUX 103, provided to the gate voltages of transistor 156A and 150A, correspond to regulation of either VBUS or VBATT, respectively. Thus, by using DeMUX 103, controller 22 can cause the output of error amplifier 127, as provided via transistor 121, to control transistor 156A or 150A, which correspond to regulation of either VBUS or VBATT, respectively, to provide regulated output voltage VREGO.

Transistor 121 is driver by error amplifier 127. Error amplifier 127 compares a reference voltage provided by voltage source 130 (labeled "VREF") to regulated output voltage VREGO. Thus, error amplifier 127, transistor 121, DeMUX 103, and either transistors 156A-156B or transistors 150A-150B constitute a negative feedback loop that regulates output voltage VREGO.

Regulation from VBUS may be turned off by raising the gate of transistor 156A to the VBUS voltage level. Regulation from VBUS may be performed by controller 22 controlling DeMUX 103 so that the output voltage of error amplifier 127, provided via transistor 121, is coupled to the gate of transistor 156A. Conversely, regulation from VBATT may be turned off by raising the gate of transistor 150A to the VBATT voltage level. Regulation from VBATT may be performed by controller 22 controlling DeMUX 103 so that the output voltage of error amplifier 127, provided via transistor 121, is coupled to the gate of transistor 150A. Thus, voltage regulator 25B can provide regulated output voltage VREGO from either input voltage VBUS or from input voltage VBATT.

Comparator 124 compares output voltage VREGO (or a scaled version of it) to reference voltage VREF. If output voltage VREGO (or a scaled version of it) falls below reference voltage VREF, comparator 124 provides a warning or status signal at its output, i.e., it indicates a too-low or below threshold or specified or desired level of the output voltage. In the embodiment shown, comparator 124 provides the warning or status signal to circuitry external to voltage regulator 25B (e.g., a control circuit, a processor, such as an MCU, etc.). Alternatively, comparator 124 provides the warning or status signal to controller 22, as desired. In that case, controller 22 can either switch regulation of VBUS to VBATT, or vice-versa, or engage or enable bypass mode (described below) in order to attempt to correct or correct the too-low or below threshold level of the output voltage of voltage regulator 25B.

As noted above, transistor 156B and transistor 150B are used in a cascode configuration to provide protection for transistors 156A and 150A, respectively. In other words, the power path from each input voltage (VBUS and VBATT) to the output (VREGO) is made of two cascode-coupled transistors that have relatively low (e.g., 3 V) maximum operating voltages. In the embodiment shown, transistors 156A-

156B and 150A-150B constitute p-channel MOSFETs. The n-well (or body or bulk) of transistors 156B and 150B are dynamically switched by controller 22, by providing signals 156B1 and 150B1, respectively. Signals 156B1 and 150B1 are switched or adjusted or controlled to have levels that prevent parasitic diode (between the source region and the body region or between the drain region and the body region) conduction when an input voltage (VBUS or VBATT) falls below the output voltage VREGO of voltage regulator 25B.

In some embodiments, if an input voltage (VBUS or VBATT) that is used to generate regulated output voltage VREGO falls below a threshold (e.g., VREGO minus the dropout voltage), controller 22 causes regulation from the other input voltage (e.g., switches from regulation from VBUS to regulation from VBATT, or vice-versa, as described above, depending on which of the two input voltages was being used to provide the output voltage). In some embodiments, similar to voltage regulator 25A discussed above, voltage regulator 25B includes a bypass mode. Specifically, if both input voltages fall below the threshold (e.g., VREGO minus the dropout voltage), controller 22 causes transistors 156A-156B or transistors 150A-150B to fully turn on, thus bypassing the negative feedback control loop, and coupling the input voltage (VBUS or VBATT, depending on which is higher) to the voltage regulator output voltage. In this manner, the output voltage is provided such that it is closer to (or remains closer to for a longer period of time) the target regulator output voltage VREGO. As an alternative, rather than engaging the bypass mode automatically, the bypass mode may be engaged manually, for example, by the user of IC 13, or a by circuit (controller, processor, etc.) detecting that the VBUS and/or VBATT voltages have below the safe operating voltage of the transistors, such as 3 V in some embodiments, or a desired or given threshold. Turning on the bypass mode turns off the control loop and turns on the appropriate transistor (e.g., 156A-156B, 150A-150B, etc.) in the power path by pulling its gate to ground potential (hence the 3 V level discussed above).

FIG. 7 illustrates a circuit arrangement 170 for a multiple-input ULD voltage regulator 25C according to another exemplary embodiment. Generally, voltage regulator 25C receives and buffers a voltage NCAS_ALL and provides the resulting voltage as output voltage VREGO. In effect, the NCAS_ALL voltage serves as a reference voltage for voltage regulator 25C. Note that the exemplary embodiment shown in FIG. 7 does not provide regulation using a negative feedback loop as do the exemplary embodiments of voltage regulators 25A and 25B in FIGS. 5 and 6, respectively.

Referring again to FIG. 7, circuit arrangement 170 includes transistors 176A and 173A, the drains of which receive input voltages VBUS and VBATT, respectively. The gates of transistors 176A and 173A are driven by voltage NCAS_ALL. Thus, the sources of transistors 176A and 173, respectively, have voltages roughly equal to the NCAS_ALL voltage minus the transistor's respective threshold voltages. In effect, if either input voltage (VBUS or VBATT) is larger than NCAS_ALL minus the threshold voltage of transistor 176A or transistor 173A, respectively, output voltage VREGO is limited to the voltage at the source of transistor 176A or transistor 173A (depending on whether regulation from VBUS or from VBATT is desired or caused by controller 22, as described below).

A stack of transistors 176B-176C couples the source of transistor 176A to the output of voltage regulator 25C, i.e., the node that provides output voltage VREGO. Thus, turning on transistors 176B-176C causes the voltage at the source of transistor 176A to appear as output voltage VREGO of voltage regulator 25C. Similarly, a stack of transistors 173B-173C couples the source of transistor 173A to the output of voltage regulator 25C. Hence, turning on transistors 173B-173C causes the voltage at the source of transistor 173A to appear as output voltage VREGO of voltage regulator 25C.

Controller 22 drives the gates of transistors 176B-176C via signals 176B2 and 176C2 to turn on or turn off transistors 176B-176C, respectively. Similarly, controller 22 drives the gates of transistors 173B-173C via signals 173B2 and 173C2 to turn on or turn off 173B-173C, respectively. To provide output voltage VREGO from input voltage VBUS, controller 22 turns on transistors 176B-176C, and turns off transistors 173B-173C. Conversely, to provide output voltage VREGO from input voltage VBATT, controller 22 turns on 173B-173C, and turns off transistors 176B-176C. Using two transistors (i.e., 176B-176C or 173B-173C) instead of one transistor causes the parasitic diodes of the transistors appear in a back-to-back configuration and helps to avoid parasitic conduction paths through those diodes.

In the embodiment shown, transistors 173B-173C and 176B-176C constitute p-channel MOSFETs. The n-well (or body or bulk) of transistors 173B-173C and 176B-176C are dynamically switched by controller 22, by providing signals 173B1, 173C1, 176B1, and 176B1, respectively. Signals 173B1, 173C1, 176B1, and 176B1 are switched or adjusted or controlled to have levels that prevent parasitic diode (between the source region and the body region or between the drain region and the body region) conduction when an input voltage (VBUS or VBATT) falls below the output voltage VREGO of voltage regulator 25C. As an alternative, in some embodiments, the bulk of transistor 176C is coupled to regulated output voltage VREGO, and the bulk of transistor 176B is coupled to the common net between 176A and 176B (a similar arrangement is used for transistors 173C and 173B). The "inside-out" bulk connection or coupling prevents back-conduction from VREGO when VBUS or VBATT has a level below VREGO and the corresponding power path is not selected or enabled or used. If the power path is selected, VREGO eventually discharges down to (NCAS_ALL-Vtn) through the p-type MOS (PMOS) transistors, where Vtn denotes the n-channel transistor threshold voltage (e.g., for transistor 176A, 173A, etc.).

Figure 8:
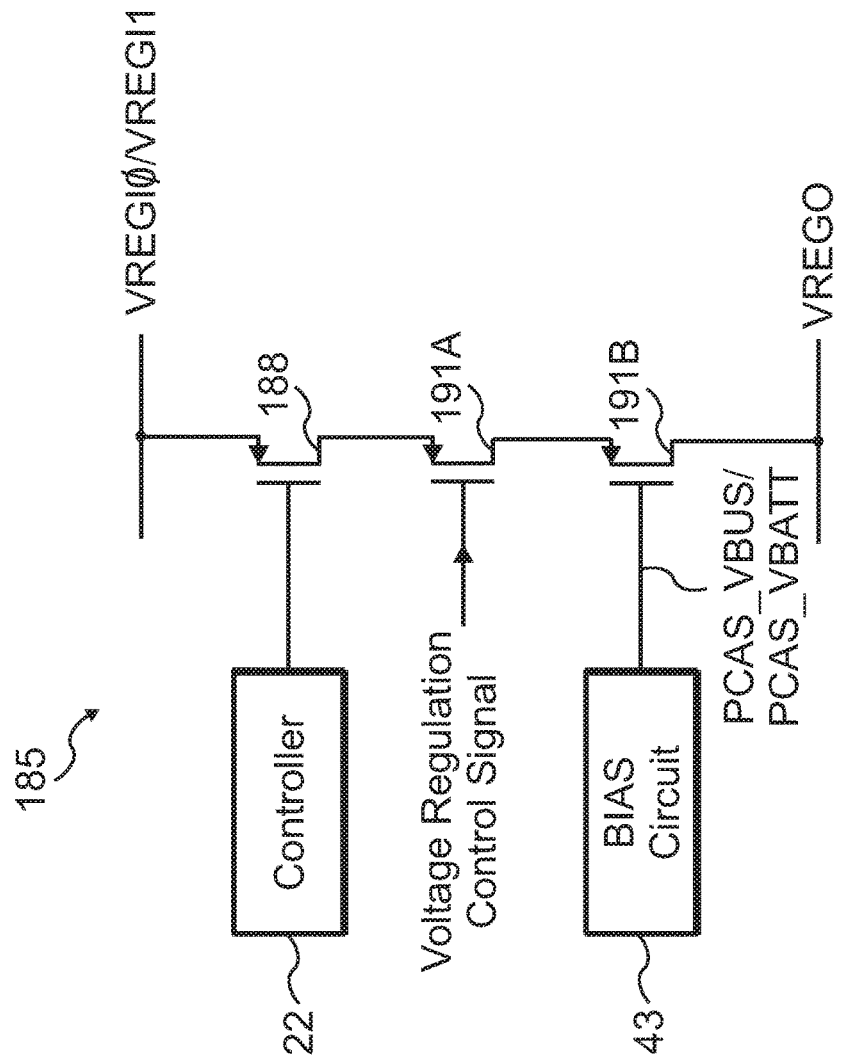
FIG. 8 shows a circuit arrangement for power multiplexing according to an exemplary embodiment.

One aspect of the disclosure relates to providing power multiplexing or power MUXs. FIG. 8 shows a circuit arrangement 185 for power multiplexing according to an exemplary embodiment. Circuit arrangement 185 shows transistors 191A-191B coupled in a cascode arrangement. The gate of transistor 191A is driven by a voltage regulation control signal, for example, a negative feedback control signal, as described above. The gate of transistor 191B is driven by an appropriate cascode signal from bias circuit 43 in order to protect transistor 191A, as described.

Transistor 188 is coupled between transistor 191A and the regulator input voltage (e.g., VREGI0 or VREGI1 (or VBUS or VBATT)). Controller 22 drives the gate of transistor 188 in order to turn on or turn off transistor 188. By turning off transistor 188, controller 22 isolates transistors 191A-191B from the regulator input voltage, thus interrupting the flow of current from the input voltage or source. As a result, other regulators (not shown) can drive and regulate the output voltage VREGO. Conversely, by turning on transistor 188 and driving the gate of transistor 191A, controller 22 causes transistor 191A (in cooperation with cascode transistor 191B) to drive and regulate the output voltage VREGO, as described above. Thus, the addition of transistor 188 allows the provision of power multiplexing, e.g., the functionality of power MUX 28 (see FIG. 1).

Referring again to FIG. 8, circuit arrangement 185 may be applied to a variety of voltage regulators, as desired. For instance, to apply power multiplexing to regulator 25A in FIG. 5, one instance of circuit arrangement 185 is used in which transistors 191A-191B are replaced by transistors 88A-88B, and another instance of circuit arrangement 185 used in which transistors 191A-191B are replaced by transistors 91A-91B. Similarly, to apply power multiplexing to regulator 25B in FIG. 6, one instance of circuit arrangement 185 is used in which transistors 191A-191B are replaced by transistors 150A-150B, and another instance of circuit arrangement 185 used in which transistors 191A-191B are replaced by transistors 156A-156B. Appropriate control signals (e.g., from negative feedback loops) and bias signals (e.g., PCAS_VBUS or PCAS_VBATT) may be applied to the transistors in the cascode stack, as described above.

In the case of voltage regulator 25C in FIG. 7, power multiplexing may be applied by using controller 22 to apply appropriate signals to the gates of transistors 173B, 173C, 176B, and 176C. More specifically, in voltage regulator 25C in FIG. 7, transistors 173A and 176A constitute n-channel MOSFETs. By tying the gates of transistors 176B and 176C to NCAS_ALL (rather than ground), controller 22 can cause transistor 176A to turn off. Similarly, by tying the gate of transistor 173B to its source and the gate of 173C to its drain (rather than ground), controller 22 can cause transistor 173A to turn off. Doing so isolates input voltages VBUS and VBATT, respectively, from the output of voltage regulator 25C. As a result, other regulators (not shown) can drive and regulate the output voltage VREGO. Conversely, with reference voltage NCAS_ALL applied to the gates of transistor 173A or transistor and 176A, controller 22 allows the respective transistor (in cooperation with the stack of transistors 173B-173C or 176B-176C, respectively) to drive and regulate the output voltage VREGO, as described above.

Another aspect of the disclosure relates to providing battery charging functionality in addition to power regulation. More specifically, as noted above, in some embodiments, a battery provides an input voltage (denoted as VBATT) to regulator 16. In some embodiments, IC 13 may include a battery charger to charge the battery that provides VBATT, as desired. In this manner, IC 13 provides the additional functionality of battery charging integrated together with voltage or power regulation, thus increasing functionality and flexibility of IC 13.

Figure 9:
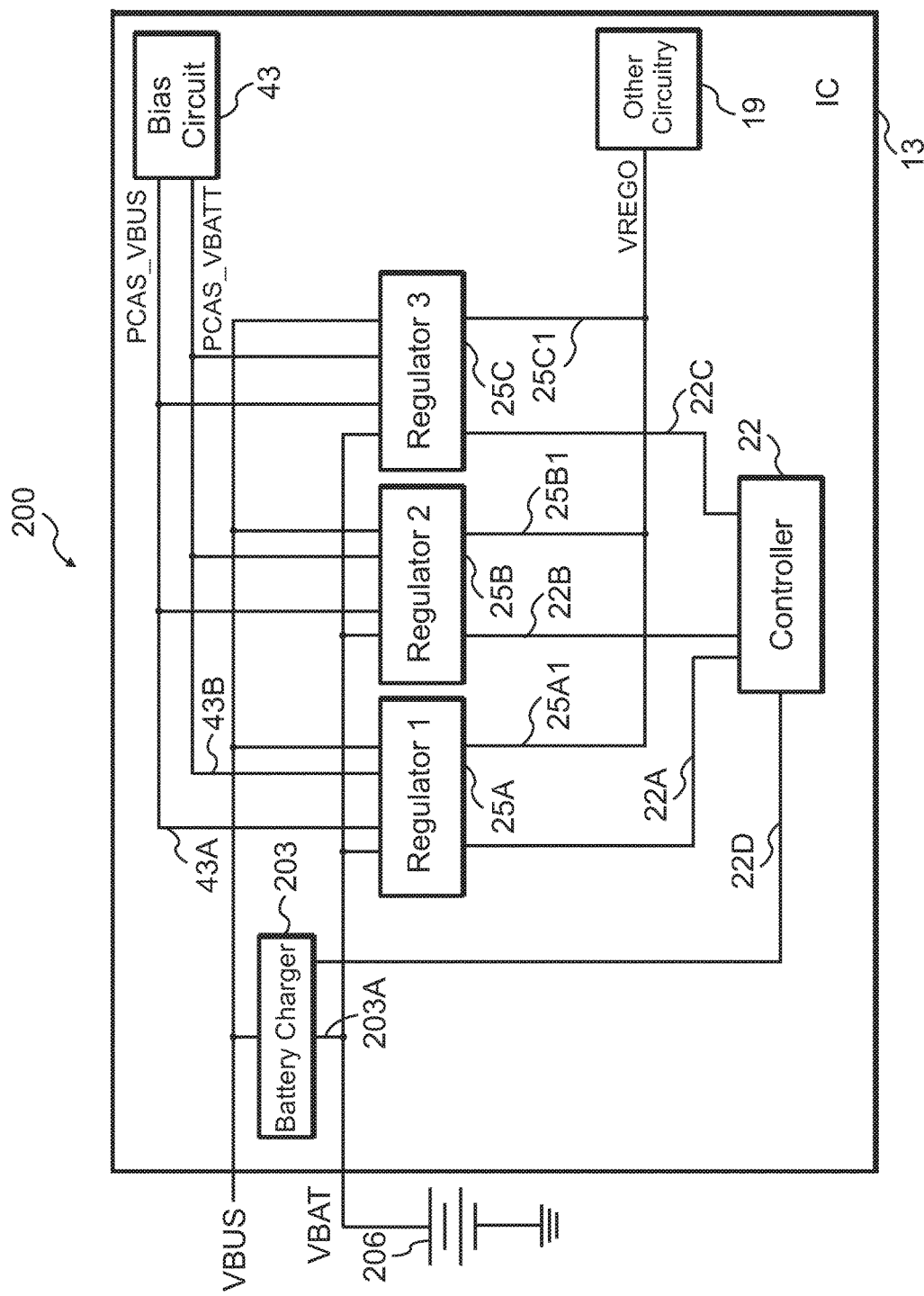
FIG. 9 illustrates a circuit arrangement for providing power from multiple input sources with battery charging capability according to an exemplary embodiment.

FIG. 9 illustrates a circuit arrangement 200 for providing power from multiple input sources with battery charging capability according to an exemplary embodiment. Generally, circuit arrangement 200 is similar to the embodiment shown in FIG. 3. Referring again to FIG. 9, circuit arrangement 200 in addition includes battery charger 203, which is integrated in IC 13. Battery charger 203 is coupled to battery 206, which is external to IC 13. Battery charger 203 receives input voltage VBUS, and generates a battery charging signal that it provides at output 203A to battery 206. Battery 206 provides input voltage VBATT to voltage regulators 25A-25C, as described above.

If the current capability of VBUS allows, battery charger 203 may charge battery 206 while voltage regulators 25A-25C generate regulated output voltage VREGO, as described above. If, however, the source for input voltage VBUS lacks sufficient capacity, the current drawn by battery charger 203 to charge battery 206 and/or the current drawn by voltage regulators 25A-25C may be reduced or limited in order to avoid overloading the source for input voltage VBUS.

Figure 10:
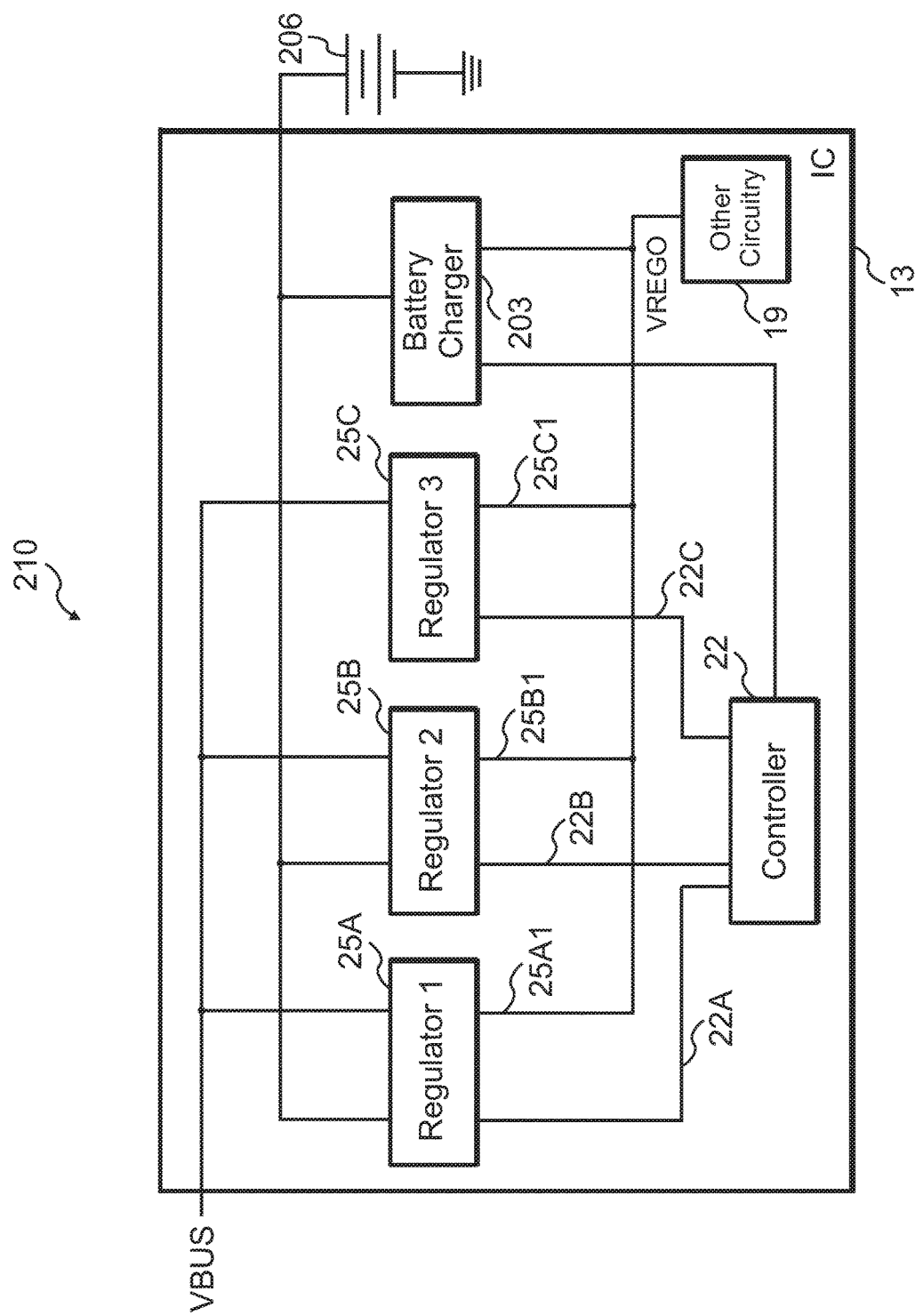
FIG. 10 depicts a circuit arrangement for providing power from multiple input sources with battery charging capability according to another exemplary embodiment.

In some embodiments, rather than charging battery 206 by using VBUS as an input voltage, battery charger 203 may use VREGO as its input voltage. FIG. 10 depicts a circuit arrangement 210 according to an exemplary embodiment that includes this configuration. Given that VBATT is typically lower than VREGO (even for a charged battery), battery charger 203 uses a boost circuit (e.g., voltage doubler or switch mode step-up converter) to generate the charge signal at output 203A. This configuration may be appropriate for situations where the battery is charged using relatively small amounts of current, e.g., over longer periods of time.

A variety of circuits, configurations, and control schemes may be used for battery charger 203. Some examples include apparatus and associated methods disclosed in commonly owned U.S. patent application Ser. No. 14/979,514, filed on Dec. 27, 2015, titled "Apparatus for Digital Battery Charger and Associated Methods," and in commonly owned U.S. patent application Ser. No. 14/979,516, filed on Dec. 27, 2015, titled "Apparatus for Power Path Battery Charger and Associated Methods," which are incorporated by reference herein for all purposes. A variety of battery charging modes, profiles, or methods are contemplated in exemplary embodiments, such as constant voltage, constant current, pre-charge, float charge, etc.

Figure 11:
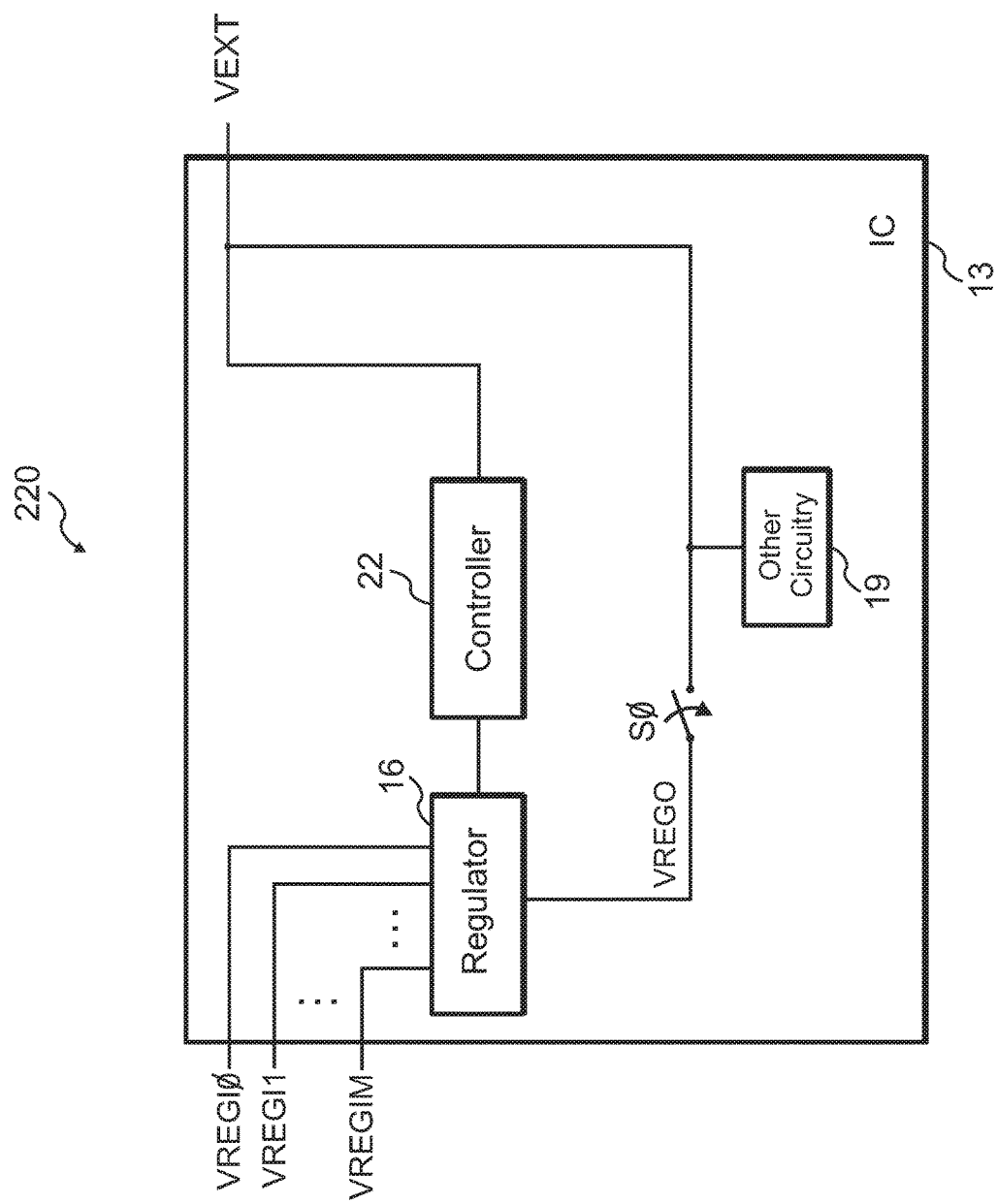
FIG. 11 shows a circuit arrangement for providing power to circuitry from multiple input sources according to an exemplary embodiment.

Another aspect of the disclosure relates to power architecture and control schemes for providing power to one or more loads from multiple inputs or sources (e.g., using one or more regulators with multiple inputs, as described above). FIG. 11 shows a circuit arrangement 220 for providing power to circuitry from multiple input sources according to an exemplary embodiment. In the embodiment shown, a load or other circuitry 19 is coupled to receive power from an external source, i.e., via a voltage source that provides an input or supply voltage VEXT. Through switch S0, other circuitry 19 may also be coupled to receive a supply voltage VREGO.

Note that, in exemplary embodiments, switch S0 may have a variety of forms. For example, in some embodiments, switch S0 may constitute a jumper or other link or coupling mechanism placed on a printed circuit board (PCB) on which IC 13 is mounted (i.e., switch S0 is external to IC 13, unlike what FIG. 11 shows). In some embodiments, switch S0 may constitute a mechanical switch (relay (which may be controlled by controller 22 or other means), single-pole single-throw switch, etc.) that is external to IC 13. In some embodiments, switch S0 may constitute an electronic switch, for example, a transistor, fuse, anti-fuse, etc. that is included or integrated in IC 13. In this situation, switch S0 may be controlled by controller 22, set during manufacturing or testing, during use of IC 13 (e.g., through configuration registers), configured by use of non-volatile memory (e.g., flash, as used, for example, in an MCU), etc., as desired. In some embodiments, switch S0 is used as an indication of hard-wired supply connection alternatives in a user's design. Such an indication may be made in a variety of ways, such as PCB traces (or lack of traces, i.e., no coupling), omitting switch S0 and coupling VCORE to VREGO, omitting switch S0 but not coupling VCORE to VREGO, etc., as desired.

As described above, regulator 16 (which generally may include voltage regulators 25A-25N (not shown) that receive a set of input voltages VREGI0-VREGIM, and provide regulated output voltage VREGO. Controller 22 receives a sample of input voltage VEXT, and controls the operations of regulator 16, as described above. As noted, VEXT is coupled to supply power to other circuitry 19. Depending on the position of switch S0, regulator 16 is selectively coupled to supply power to other circuitry 19. At any given time, such as the time when power is first applied to IC 13, controller 22 can properly sequence the application of power to other circuitry 19 so as to facilitate proper powering up of other circuitry 19.

As described below in detail, the circuit arrangement 220 provides the capability of powering IC 13 from input voltages (e.g., VREGI0 and VREGI1) that are typically too high (e.g., 5 V) to directly power circuitry within IC 13, such as other circuitry 19. Regulator 16 steps down (e.g., to 3 V) and regulates the input voltages to generate regulated output voltage VREGO, which is used to power other circuitry 19. Alternatively, IC 13, via controller 22, can be powered from an independent or external input voltage or source VEXT. In this scenario, regulated output voltage VREGO may be used separately, e.g., to provide power to a load other than other circuitry 19, to provide power to a load or circuit external to IC 13, etc. Furthermore, when VEXT is used to supply power to other circuitry 19, input voltages (e.g., VREGI0 and VREGI1) may be unused.

As further described below in detail, circuitry within IC 13 provides the capability of bootstrapping a power supply or source of power from multiple input sources or voltages, and to decide which of the input sources or voltages to use to power up various circuitry in IC 13, such as other circuitry 19. Circuitry in IC 13, such as other circuitry 19, can also control which input source or voltage it uses, for example, to skip using regulated output voltage VREGO of regulator 16 and to use VEXT instead.

Thus, the power architecture (circuitry used to provide power to various circuits in IC 13, such as other circuitry 19) is applicable in a variety of situations, such as when input voltages or sources may be present or absent or be provided at different times and/or levels, etc. The power architecture provides a coherent power-up sequence for various circuits in IC 13, such as other circuitry 19. Furthermore, the power architecture provides the capability for IC 13 to multiplex (power MUX) its own supplies. The power architecture also supports use of transistors with maximum operating voltages that are lower than at least one of input sources or voltages. The power architecture unifies the use of the various input sources or voltages. The power architecture provides and uses status signals for coherent control of regulator 16 and other circuitry in IC 13 to for providing power to circuits in IC 13 in a coherent manner. The capability of running autonomously with a safe start-up sequence (e.g., proper bootstrapping of power circuitry, regulator 16, other circuitry 19, etc.) provides a robust and flexible power architecture for IC 13, which might in some embodiments constitute a system-on-chip, to operate from a variety of possible input sources or voltages or supplies.

Figure 12:
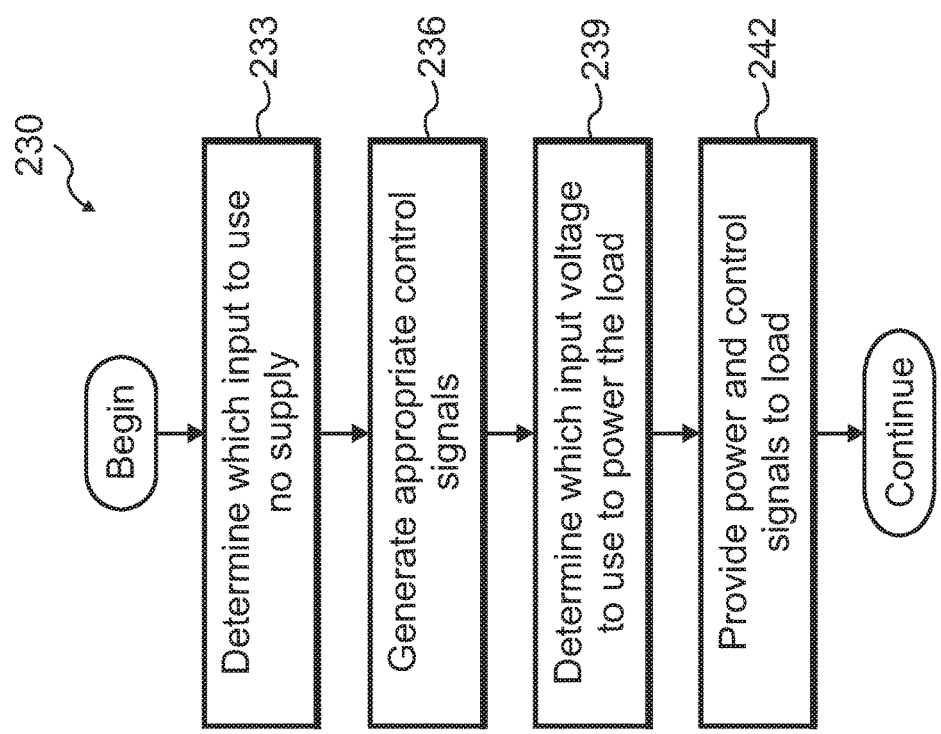
FIG. 12 illustrates a flow diagram for a process of providing power to circuitry from multiple input sources according to an exemplary embodiment.

FIG. 12 illustrates a flow diagram 230 for a process of providing power to circuitry from multiple input sources according to an exemplary embodiment. At 233, a determination is made as to which input source (or sources) (e.g. VREGI0, VREGI1, VEXT, etc.) is available for use as a power supply in order to initially power or bootstrap the circuitry. For instance, a determination is made as to which input source (or sources) is available to provide power to circuitry such as controller 22 (not shown) that in turn facilitates powering up of other circuitry 19 (not shown). At 236, appropriate control signals are provided to facilitate provision of power from the determined source. At 239, a determination is made as to which input source (or sources) (e.g. VREGI0, VREGI1, VEXT, etc.) is available for use as a power supply in order to initially power one or more loads (e.g., other circuitry 19). At 242, power and/or control signals are provided to the one or more loads (e.g., other circuitry 19). Details of the process and related apparatus and circuit arrangements are described further below.

Figure 13:
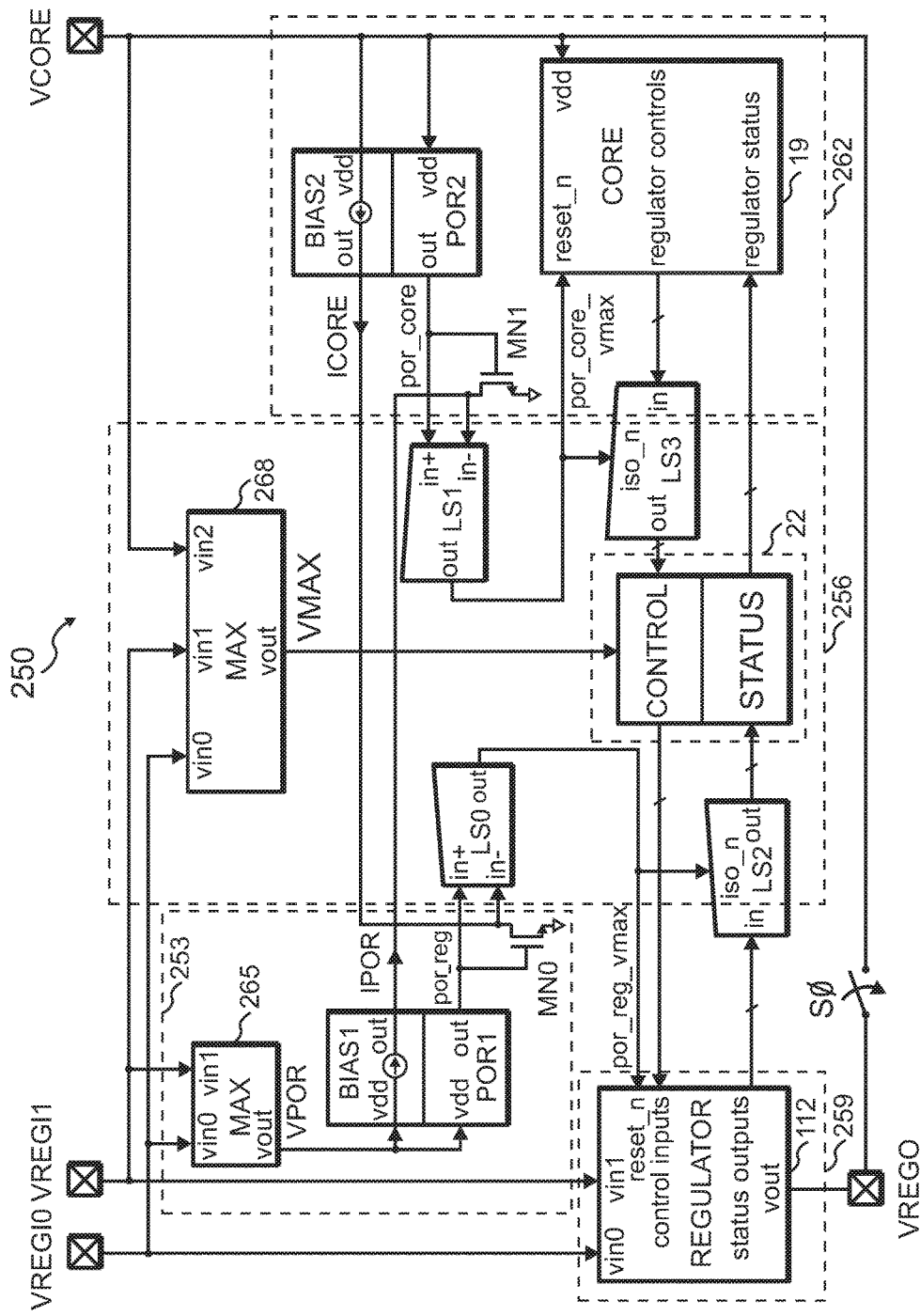
FIG. 13 depicts a circuit arrangement for providing power, and controlling the provision of power, from multiple input sources according to an exemplary embodiment.

FIG. 13 depicts a circuit arrangement 250 for providing power, and controlling the provision of power, from multiple input sources to one or more circuits, according to an exemplary embodiment. Thus, circuit arrangement 250 in effect includes a power controller (including various blocks, as described below) in IC 13 that provides power from multiple input sources to one or more circuits (e.g., other circuitry 19, described above). The power controller provides a variety of functions, such as powering one or more circuits from arbitrary input voltages (e.g., arbitrary voltage values, arbitrary voltage values as a function of time, etc.) or multiple input voltages, proper power sequencing for circuitry within the power controller (e.g., controller 22, level shifters, etc., described below) to properly power up or more circuits (e.g., other circuitry 19, described above), bootstrapping of power for various circuits in the power controller and, ultimately, one or more circuits (e.g., other circuitry 19, described above), etc. In circuit arrangement 250 according to the embodiment shown in FIG. 13, regulator 16 receives two power or input voltages VREGI0 and VREGI1. In some embodiments, VREGI0 and VREGI1 may correspond, respectively, to VBUS and VBATT, described above. Other types and/or numbers of input voltages or sources may be applied to regulator 16, as desired. Controller 22 includes two blocks or circuits, labeled "CONTROL" and "STATUS," which provide control signals and receive status signals, respectively. Other arrangements may be used in alternative embodiments, as persons of ordinary skill in the art will understand.

Furthermore, without loss of generality, other circuitry 19 in circuit arrangement 250 is denoted as "core," e.g., a processor (e.g., in an MCU), core circuitry of a processor, MCU, and the like, which may be running firmware, software, etc., and has a corresponding external supply or voltage input VCORE (equivalent to VEXT, described above). When reset_n=0, core 19 is in an idle state. When reset_n=1, however, core 19 is running or operating. In this state, core 19 outputs regulator controls to controller 22 in order to set or control the operation of regulator 16 based on the regulator status inputs, received via controller 22. As persons of ordinary skill in the art will understand, other types of circuitry (generally "other circuitry 19") may be used in place of core 19 in alternative embodiments, as desired.

Circuit arrangement 250 includes several power domains: power on reset voltage (VPOR) (described below) domain 253, maximum voltage VMAX (described below) domain 256, regulator or VREGI0/VREGI1 domain 259, and VCORE domain 262. The various power domains use or are powered up by differing or potentially differing voltage levels. A number of level shifters, labeled LS0, LS1, LS2, and LS3, provide appropriate level shifting between various domains to facilitate coupling the power domains to one another and for circuitry in the various power domains to communicate or work or cooperate with one another. In the embodiment shown, level shifters LS0 and LS1 constitute differential level shifters, where in+ and in− are differential digital inputs from an arbitrary power domain of IC 13. When in+='0' AND in−='1', out=0, whereas when in+='1' AND in−='0', out=VMAX (described below).

In the embodiment shown, level shifters LS2 and LS3 constitute level shifter banks with isolation. Signal in is a digital input from an arbitrary power domain. When iso_n='0', outputs are in reset state, independent of inputs. The reset state of level shifter LS2 indicates that regulator 16 is not powered up. The reset state of level shifter LS3 indicates that core 19 is not powered up, and to start voltage regulation of VREGO in default mode (e.g., using one of VREGI0 and VREGI1). Conversely, when iso_n='1', if in='0', then out=0, whereas if in='1', then out=VMAX.

Regulator 16, as described above, may include multiple regulators, which have the capability of providing regulated output voltages (e.g., VREGO) from multiple input voltages (e.g., VREGI0 and VREGI1). In circuit arrangement 250, input voltages VREGI0 and VREGI1 drive inputs vin0 and vin1 of regulator 16, respectively. Regulator 16 also receives a reset input (reset_n) and control inputs from controller 22, and provides status outputs to controller 22 via level shifter LS2. When reset_n=0, vout of regulator 16 is in a high-impedance state (e.g., allows VREGO to float if switch S0 is open, or for VCORE to determine the state of VREGO if switch S0 is closed). When reset_n=1, the behavior of regulator 16 is determined by the control inputs. More specifically, regulator 16 may be disabled such that vout is in a high impedance state, or regulator 16 may be in voltage regulation modes such that power is drawn from vin0 or vin1 to drive vout to a specific or desired or target voltage.

Maximum (MAX) circuit 265 receives as inputs the voltages applied to inputs vin0 and vin1 of regulator 16. In response, MAX circuit 265 provides the larger of the two input voltages as output voltage VPOR (power on reset voltage). In other words, vout=max(vin0, vin1), where "max" denotes a mathematical maximum or greater of function. MAX circuit 268 operates similarly, but has three inputs, vin0, vin1, and vin2, which are driven by VREGI0, VREGI1, and VCORE, respectively. MAX circuit 268 provides the largest of the three input voltages as voltage VMAX to controller 22. Thus, vout=max(vin0, vin1, vin2). Voltage VMAX provides power (i.e., is a power supply or supply voltage) to circuitry in controller 22, such as the control and status blocks shown. Being powered via VMAX power domain 256 results in controls signals from controller 22 and status signals received in controller 22 being coherent in all stages of power-up in all power schemes for circuit arrangement 250 (and IC 13, generally). Voltage VMAX is powered or available when IC 13 is powered, as IC 13 is powered either via VREGI0 and/or VREGI1, or via VCORE. As VMAX power domain 256 includes the control and status signals of regulator 16, the control and status signals are coherent (or valid or available) when IC 13 is powered. In exemplary embodiments, MAX circuit 265 and MAX circuit 268 may be implemented in a variety of ways. For example, MAX circuit 265 and/or MAX circuit 268 may be implemented using a plurality (equal to the number of inputs of the MAX circuit) of diodes with input voltages applied to the anodes (or cathodes) of the diodes, with the cathodes (anodes) coupled together to provide the output voltage. As another example, MAX circuit 265 and/or MAX circuit 268 may be implemented using comparators that compare the levels of the input voltages and provide the largest input voltage as the output voltage of the MAX circuit.

VPOR power domain includes the POR1 block, and VCORE power domain 262 includes the POR2 block. The POR1 and POR2 blocks indicate the presence of a voltage supply (valid or available voltage to supply power) in the respective power domains by providing output signals por_reg and por_core, respectively. Output signals por_reg and por_core are provided via level shifter LS0 and level shifter LS1 to VMAX power domain 256. As a result, the status of powering IC 13 (more specifically, core 19) is known. Low power biasing (provided by the BIAS1 and BIAS2 blocks, described below) from VREGI0/VREGI1 and VCORE, respectively, are used to provide for correction operation of the level shifters the originating supply (the supply for the power domain in which an input signal to a level shifter originates) is absent.

As noted, control signals from core 19 are level shifted into VMAX power domain 256 so that regulator 16 always has coherent control signals. To further enhance coherence, the core POR signal is used to isolate (via level shifter LS3) the regulator control signals from core 19 until core 19 has sufficient supply voltage for proper operation. Similarly, regulator 16 status signals are level shifted into VMAX power domain 256 so that core 19 always has a coherent status (coherent status signals) of regulator 16. To further enhance coherence, the POR1 block (in VPOR power domain 253) is used to isolate (via level shifter LS2) the status signals from regulator 16 until regulator 16 has sufficient supply voltage for proper operation.

Voltage VPOR drives the BIAS1 and POR1 blocks as supply voltage (labeled "vdd"). Similarly, voltage VCORE drives the BIAS2 and POR2 blocks. The BIAS1 and BIAS2 blocks constitute low power bias circuits. The output (labeled "out") provides a relatively low current (e.g., nA-level) via a current source pulling up to input supply (vdd). The current sources in the BIAS1 and BIAS2 blocks set the default states of level shifters LS0 and LS1, respectively. The current sources in the BIAS2 and POR2 blocks are active before the associated power on reset (POR) triggers. The POR1 and POR2 blocks use associated POR thresholds to generate POR signals at outputs labeled "out." The POR1 and POR2 blocks generate POR output signals as follows: When (vdd<POR threshold), out=0. Conversely, when (vdd POR threshold), out=vdd.

The BIAS1 block generates an output signal IPOR that drives an input of LS1, and is also applied to the drain of transistor MN1. Similarly, the BIAS2 block generates an output signal ICORE that drives an input of level shifter LS0, and is also applied to the drain of transistor MN0. The POR1 and POR2 blocks generate respective output signals por_reg and por_core. Signal por_reg drives an input of level shifter LS0, and the gate of transistor MN0. Conversely, signal por_core drives an input of level shifter LS1, and the gate of transistor MN1. The output signal por_reg_vmax of level shifter LS0 drives input reset_n of regulator 16 and iso_n input of LS2. The output signal por_core_vmax of level shifter LS1 drives input reset_n of core 19 and iso_n input of LS3.

Figure 14:
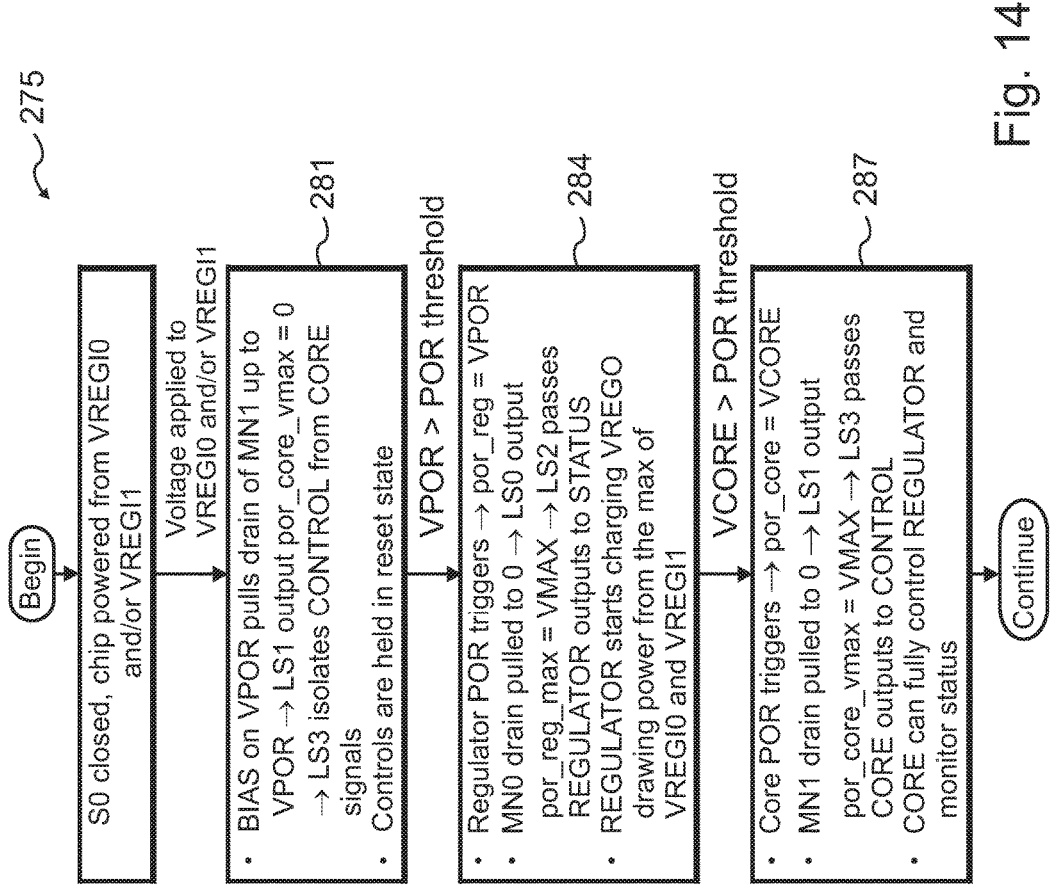
FIGS. 14-16 show flow diagrams for providing power from multiple sources to a load (or circuitry or loads) according to exemplary embodiments.
Figure 15:
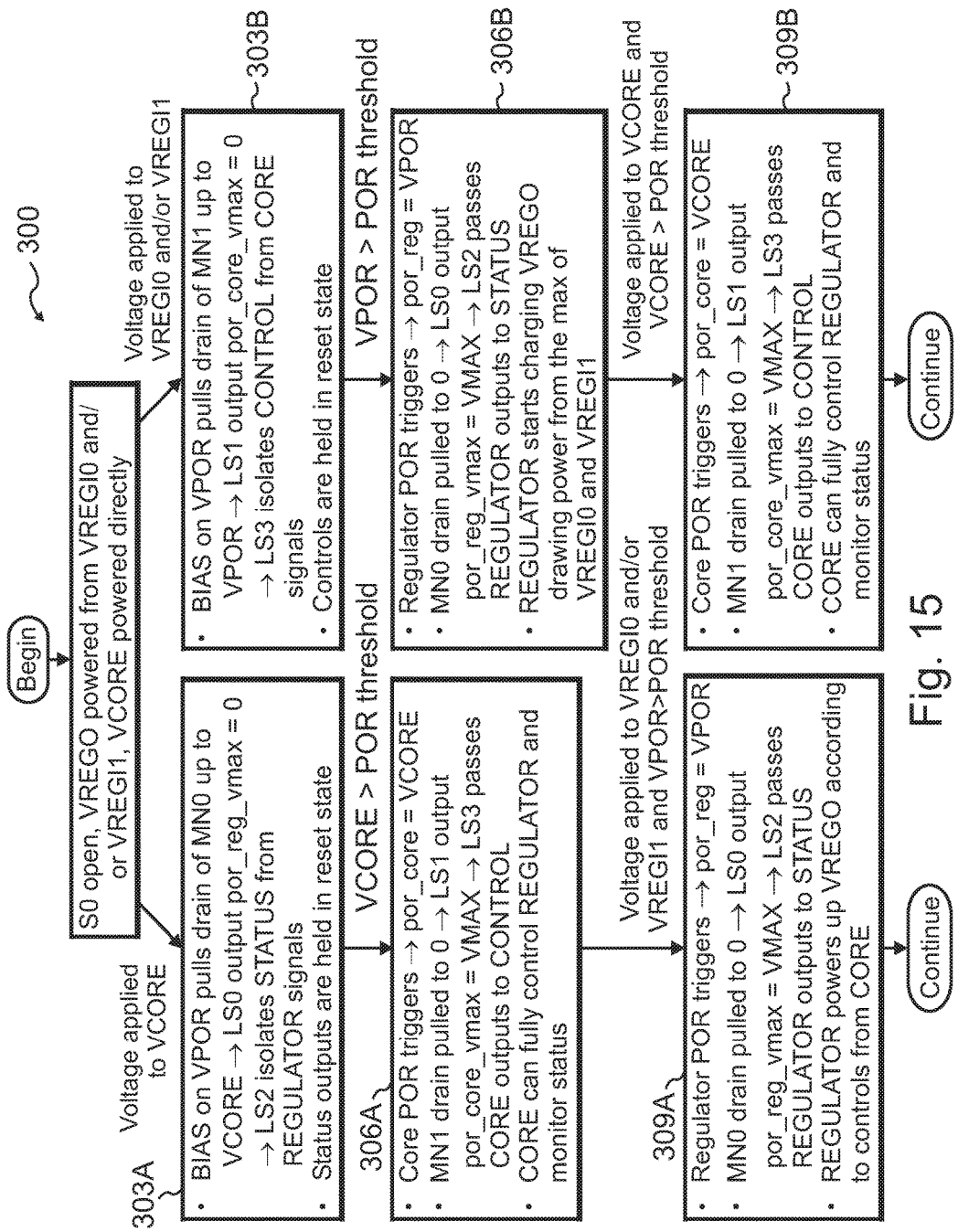
Figure 16:
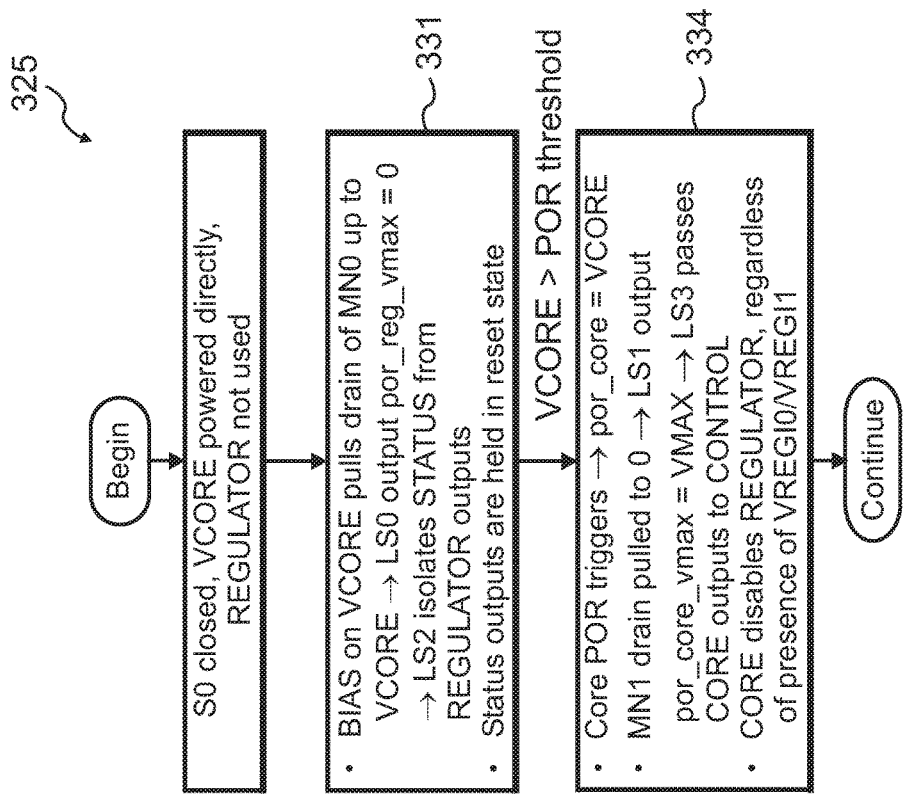

FIGS. 14-16 show flow diagrams for the operation of the exemplary embodiment shown in circuit arrangement 250. FIG. 14 shows the situation where switch S0 is closed, and IC 13 is powered from input voltage VREGI0 and/or input voltage VREGI1. When voltage is applied to VREGI0 and/or VREGI1 (i.e., a source provides voltage to VREGI0 and/or a source provides voltage to VREGI1), at 281 the BIAS1 block coupled to VPOR pulls the drain of transistor MN1 up to VPOR, which causes por_core_vmax=0 (output signal of level shifter LS1), and level shifter LS3 to isolate the control block in controller 22 from signals from core 19. The control signals provided to controller 22 are held in a reset state. When (VPOR>POR threshold), at 284, the POR1 block triggers, i.e., por_reg=VPOR. The drain of transistor MN0 is pulled to 0, the output of level shifter LS0, por_ reg_vmax, has the voltage VMAX, and level shifter LS2 passes output status signals of regulator 16 to the status block in controller 22. Regulator 16 starts charging the node VREGO (e.g., charging parasitic or bypass capacitors coupled to the node), and draws power from the source corresponding to the greater of input voltages VREGI0 and VREGI1.

When (VCORE>POR threshold), at 287, the POR2 block triggers, i.e., por_core=VCORE. The drain of transistor MN1 is pulled to 0, the output of level shifter LS1, por_core_vmax, has the voltage VMAX, and level shifter LS3 passes outputs of core 19 to the control block in controller 22. As a result, core 19 can control regulator 16 and also monitor the status of regulator 16.

FIG. 15 shows the situation where switch S0 is open, output VREGO is powered from input voltage input voltage VREGI0 and/or input voltage VREGI1, and VCORE is coupled to an external source. If a voltage is applied to VCORE, at 303A the BIAS2 block coupled to VCORE pulls the drain of transistor MN0 up to VCORE, which causes por_reg_vmax=0 (output signal of level shifter LS0), and level shifter LS2 to isolate the status block in controller 22 from status output signals of regulator 16. The status signals provided to controller 22 are held in a reset state. When (VCORE>POR threshold), at 306A, the POR2 block triggers, i.e., por_core=VCORE. The drain of transistor MN1 is pulled to 0, the output of level shifter LS1, por_core_vmax, has the voltage VMAX, and level shifter LS3 passes control output signals of core 19 to the control block in controller 22. Core 19 can then control regulator 16, and also monitor the status of regulator 16.

When voltage is applied via VREGI0 and/or VREGI1, and (VPOR>POR threshold), at 309A the POR1 block triggers, i.e., por_reg=VPOR. The drain of transistor MN0 is pulled to 0, the output of level shifter LS0, por_reg_vmax, has the voltage VMAX, and level shifter LS2 passes output status signals of regulator 16 to the status block in controller 22. Regulator 16 starts charging the node VREGO (e.g., charging parasitic or bypass capacitors coupled to the node), and draws power from the source corresponding to the greater of input voltages VREGI0 or VREGI1 according to control signals from core 19.

Conversely, if voltage is applied to VREGI0 and/or VREGI1 (i.e., a source provides voltage to VREGI0 and/or a source provides voltage to VREGI1), at 303B the BIAS1 block coupled to VPOR pulls the drain of transistor MN1 up to VPOR, which causes por_core_vmax=0 (output signal of level shifter LS1), and level shifter LS3 to isolate the control block in controller 22 from signals from core 19. The control signals provided to controller 22 are held in a reset state. When (VPOR>POR threshold), at 306B the POR1 block triggers, i.e., por_reg=VPOR. The drain of transistor MN0 is pulled to 0, the output of level shifter LS0, por_reg_vmax, has the voltage VMAX, and level shifter LS2 passes output status signals of regulator 16 to the status block in controller 22. Regulator 16 starts charging the node VREGO, and draws power from the source corresponding to the greater of input voltages VREGI0 and VREGI1.

If voltage is applied to VCORE and (VCORE>POR threshold), at 309B the POR2 block triggers, i.e., por_core=VCORE. The drain of transistor MN1 is pulled to 0, the output of level shifter LS1, por_core_vmax, has the voltage VMAX, and level shifter LS3 passes control output signals of core 19 to the control block in controller 22. Core 19 can then control regulator 16, and also monitor the status of regulator 16.

FIG. 16 shows the situation where switch S0 is closed, VCORE is coupled to an external source to power core 19, and regulator 16 is not used to provide power to core 19 (or other circuits in IC 13). In that situation, at 331 the BIAS2 block coupled to VCORE pulls the drain of transistor MN0 up to VCORE, which causes por_reg_vmax=0 (output signal of level shifter LS0), and level shifter LS2 to isolate the status block in controller 22 from status output signals of regulator 16. The status signals provided to controller 22 are held in a reset state. When (VCORE>POR threshold), at 334, the POR2 block triggers, i.e., por_core=VCORE. The drain of transistor MN1 is pulled to 0, the output of level shifter LS1, por_core_vmax, has the voltage VMAX, and level shifter LS3 passes control output signals of core 19 to the control block in controller 22. Core 19 can then control regulator 16, and also monitor the status of regulator 16.

Figure 17:
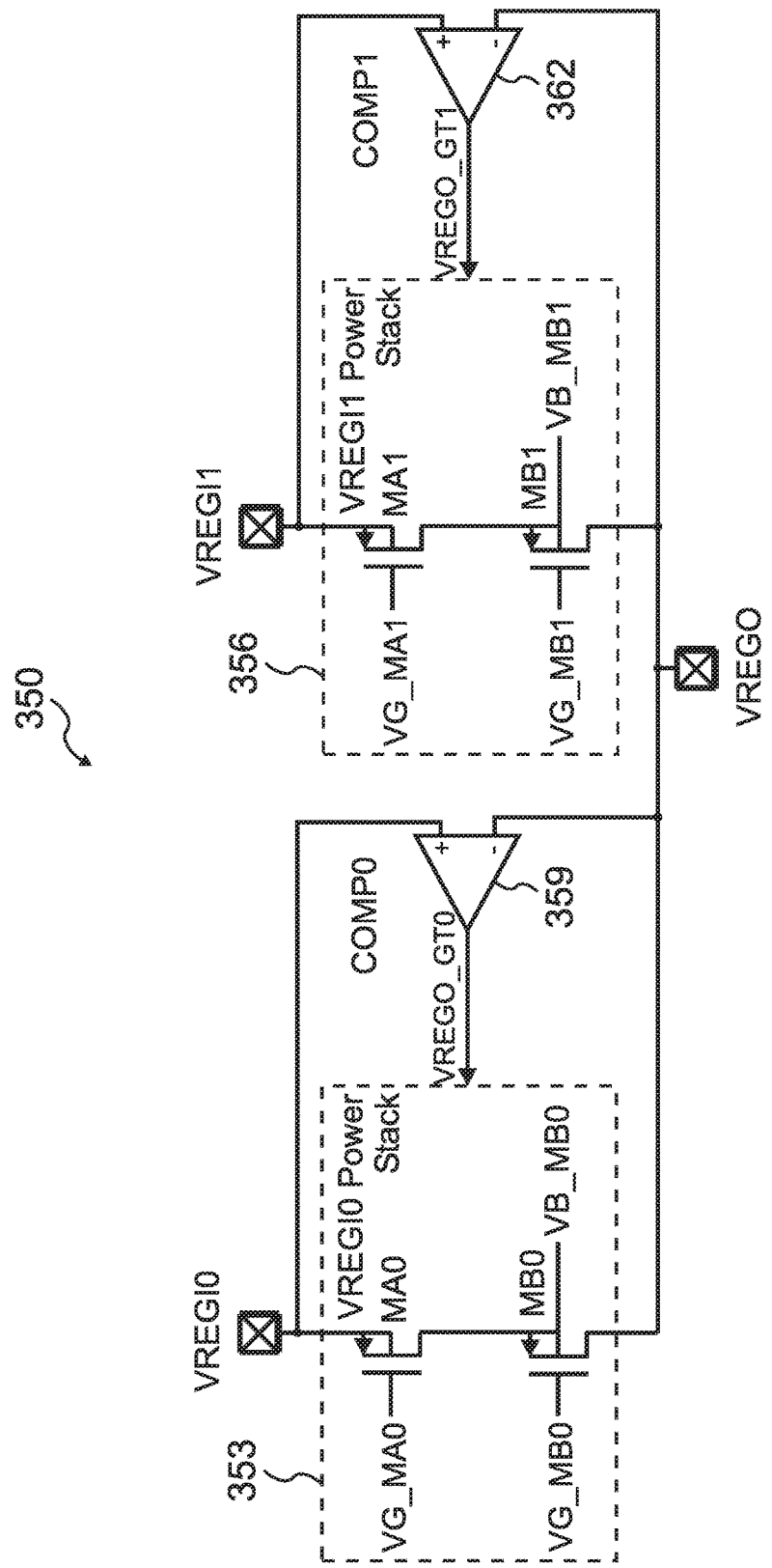
FIG. 17 illustrates a circuit arrangement to support proper operation of regulator power stacks in the presence of arbitrary regulator input voltages and output voltage.

Another aspect of the disclosure relates to determining the relative levels of the input voltages (e.g., VREGI0 and VREGI1) and the regulated output voltage VREGO in order to properly control the pass transistor or power stack (cascode configurations described above in connection with FIGS. 3, 5, and 6). FIG. 17 shows a circuit arrangement 350 to support proper operation of regulator power stacks in the presence of arbitrary regulator input voltages and output voltage (e.g., arbitrary voltage values, arbitrary voltage values as a function of time, etc.). More specifically, circuit arrangement 350 shows two input voltages, VREGI0 and VREGI1, providing power to the VREGO node via VREGI0 and VREGI1 power stacks 353 and 356, respectively. Power stacks 353 and 356 may be used in regulator 16, for example, in voltage regulator 25A (see FIG. 5) and/or voltage regulator 25B (see FIG. 6). Power stacks 353 and 356 deliver power to node VREGO when their respective power path is active or enabled (i.e., regulation from VREGI0 or VREGI1, respectively, is selected or desired). Thus, at any given time, either power stack 353 or power stack 356 is active or enabled.

VREGI0 power stack 353 includes transistors MA0 and MB0, coupled in a cascode configuration. Transistor MA0 is driven by a voltage regulator (25A, 25B, etc.) control loop, as described above. Transistor MB0 is biased appropriately in order to provide voltage protection for transistor MA0, as described above. Similarly, VREGI1 power stack 356 includes transistors MA1 and MB1, coupled in a cascode configuration. Transistor MA1 is driven by a voltage regulator (25A, 25B, etc.) control loop, as described above. Transistor MB1 is biased appropriately in order to provide voltage protection for transistor MA1, as described above. Comparator 359 compares the output voltage VREGO to the input voltage VREGI0 to generate output signal VREGO_GT0. Comparator 362 compares the output voltage VREGO to the input voltage VREGI1 to generate output signal VREGO_GT1.

Comparator output signals VREGO_GT0 and VREGO_GT1 are used (via control circuitry/logic circuitry, not shown) to properly couple the gates of transistors MA0-MA1 and MB0-MB1 and the bulks or bodies of transistors MB0-MB1 appropriately to avoid unwanted conduction between supplies (e.g., between VREGI0 and VREGI1, etc.). As an example, if (VREGO>VREGI0), then signals VG_MB0 and VB_MB0 are coupled to VREGO in order to avoid current conduction between VREGI0 and VREGO. In this situation, signals VG_MA1, VG_MB1, and VB_MB1 are controlled by controller 22 to regulate input voltage VREGI1 to generate regulated output voltage VREGO, as described above. As another example, if (VREGO>VREGI1), then signals VG_MB1 and VB_MB1 are coupled to VREGO in order to avoid current conduction between VREGI1 and VREGO. In this situation, signals VG_MA0, VG_MB0, and VB_MB0 are controlled by controller 22 to regulate input voltage VREGI0 to generate regulated output voltage VREGO, as described above.

Figure 18:
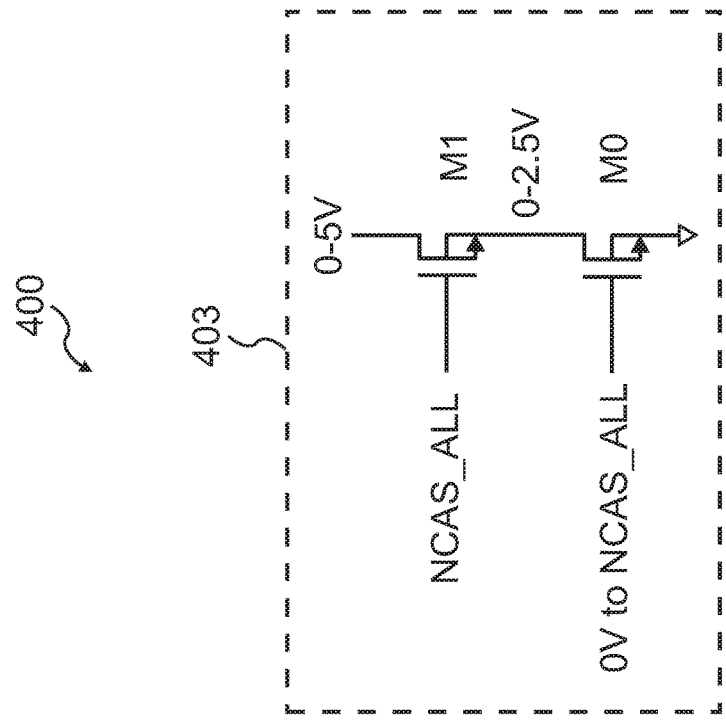
FIGS. 18-21 depict circuit arrangements for providing power from a source to a load according to exemplary embodiments by using transistors with a maximum voltage that is lower than the voltage of the power source.
Figure 19:
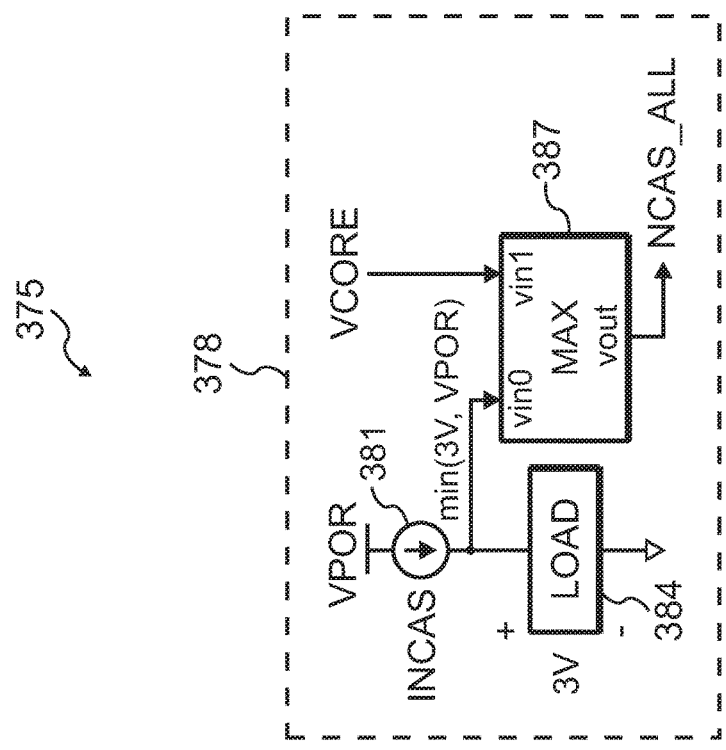
Figure 20:
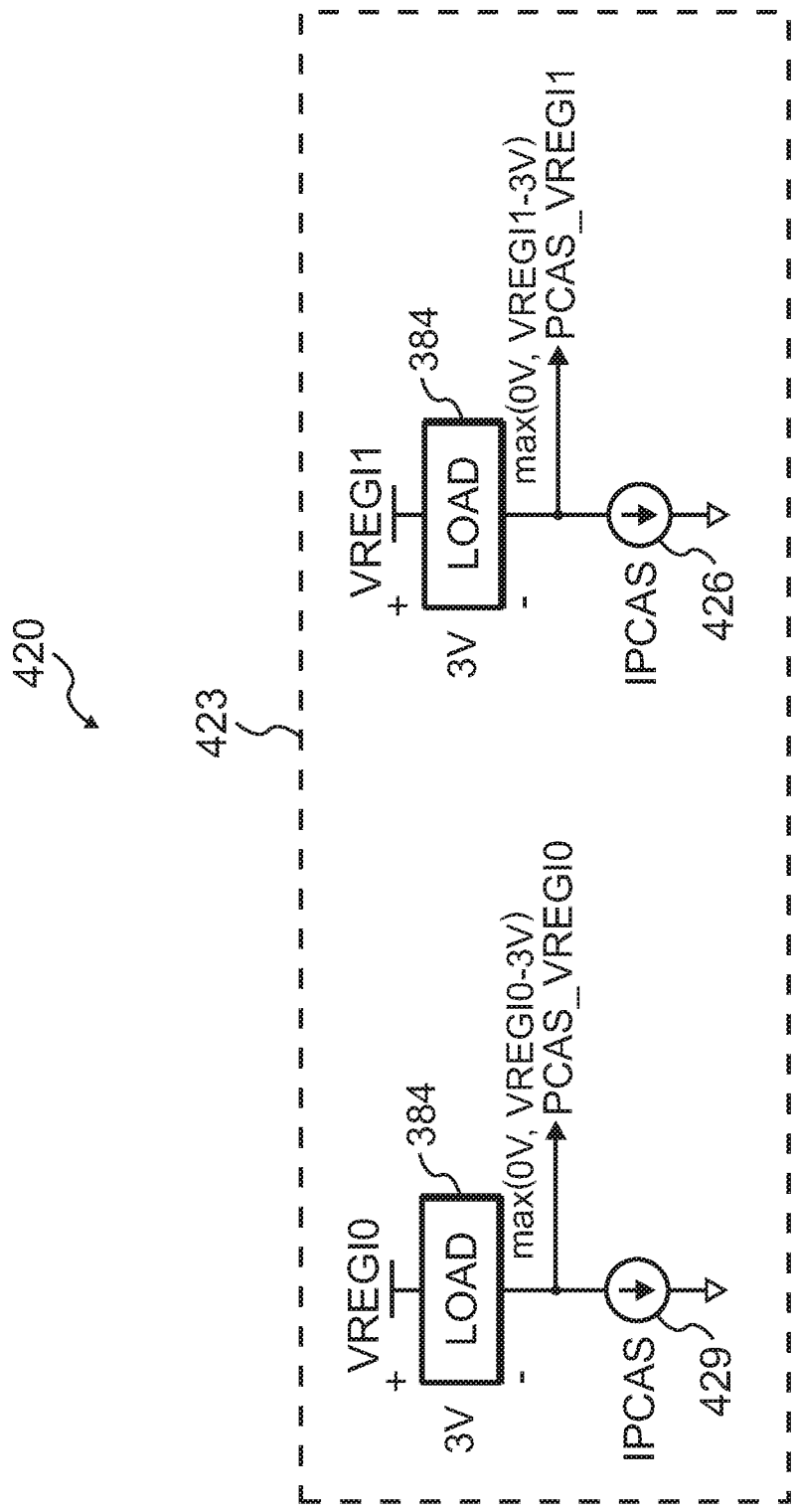
Figure 21:
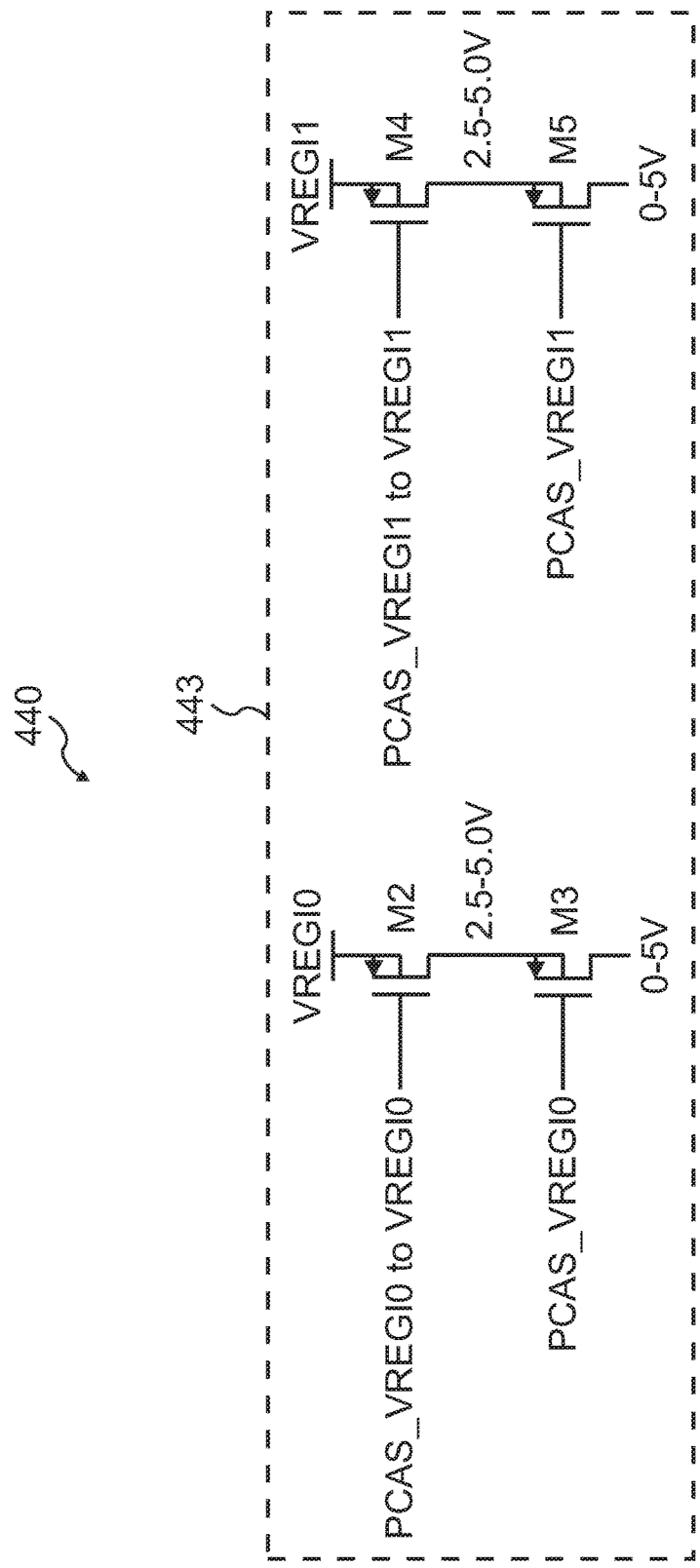

Another aspect of the disclosure relates to providing power from a source to a load according to exemplary embodiments by using transistors with a maximum voltage that is lower than the voltage of the power source. As noted above, in some embodiments, cascode configurations are used in regulator 16 (more specifically, in voltage regulators 25A, 25B, etc.) to provide protection from voltages higher than the maximum operating voltages of transistors used as pass transistors or in power stacks of voltage regulators. FIGS. 18-21 illustrate circuit arrangements for infrastructure or circuitry in IC 13 to support proper operation of such cascode configurations. More specifically, FIGS. 18 and 20 illustrate circuit arrangements for generating bias signals for biasing cascode transistors, whereas FIGS. 19 and 21 depict the use of the bias signals in various cascode configurations. Note that, without loss of generality and to facilitate presentation of the concepts, the exemplary embodiments shown in FIGS. 18-21 assume VREGI0 and VREGI1 levels of 5 V, and a VREGO level of 3 V. As persons of ordinary skill in the art will understand, however, other numbers of input voltages, other input voltage levels, and/or other output voltages may be used by making appropriate modifications to the circuit arrangements in FIGS. 18-21.

Referring to FIG. 18, circuit arrangement 375 shows a current source 381, powered from VPOR, that provides current INCAS to load 384 (e.g., a stack of several diode-connected MOSFETs) to develop a voltage of 3 V across load 384. The lesser of 3 V and VPOR is provided to one input (vin0) of MAX circuit 387. VCORE is applied to a second input (vin1) of MAX circuit 387. Output (out) of MAX circuit 387 provides the greater of the voltages at the inputs of MAX circuit 387 as bias signal NCAS_ALL. In effect, bias signal NCAS_ALL is generated to have a level of roughly 3 V above ground potential. FIG. 19 shows the use of bias signal NCAS_ALL in circuit arrangement 400. Circuit arrangement 400 includes n-type MOS (NMOS) cascode circuit 403, which includes transistor M0 (e.g., a pass transistor or other transistor controlled by a signal applied to its gate) and cascode transistor M1. More specifically, bias signal NCAS_ALL is applied to the gate of transistor M1. The signal applied to the gate of transistor M0 may vary from 0 V (ground potential) to the level of bias signal NCAS_ALL.

FIG. 20 shows a circuit arrangement 420 shows current sources 426 and 429, powered from VREGI0 and VREGI1, respectively. Each of current sources 426 and 429 draws a current WAS from load 384, thus developing about 3 V between the respective supply voltage (VREGI0 or VREGI1) and the node of load 384 that is coupled to the respective current source. A bias signal or voltage, PCAS_VREGI0, thus develops across current source 429, which is the greater of ground potential and (VREGI0—3 V). Similarly, a bias signal or voltage, PCAS_VREGI1, develops across current source 426, which is the greater of ground potential and (VREGI1—3 V). In effect, bias signals PCAS_VREGI0 and PCAS_VREGI1 are generated so as to have a level of roughly 3 V below input voltages VREGI0 and VREGI1, respectively. FIG. 21 shows the use of bias signals PCAS_VREGI0 and PCAS_VREGI1 in circuit arrangement 440. Circuit arrangement 440 includes a pair of PMOS cascode circuits 443.

Cascode circuits 443 includes a cascode configuration that includes transistor M2 (e.g., a pass transistor or other transistor controlled by a signal applied to its gate) coupled to receive power from input voltage VREGI0, and cascode transistor M3. Bias signal PCAS_VREGI0 is applied to the gate of transistor M3. The control signal applied to the gate of transistor M2 may vary from the level of bias signal PCAS_VREGI0 to the input voltage VREGI0. The cascode configuration including transistors M2 and M3 may constitute (or is similar to), for example, the cascode configuration including transistors 88A-88B (see FIG. 5) or transistors 156A-156B (see FIG. 6). Cascode circuits 443 also includes a cascode configuration that includes transistor M4 (e.g., a pass transistor or other transistor controlled by a signal applied to its gate) coupled to receive power from input voltage VREGI1, and cascode transistor M5. Bias signal PCAS_VREGI1 is applied to the gate of transistor M5. The control signal applied to the gate of transistor M2 may vary from the level of bias signal PCAS_VREGI1 to the input voltage VREGI1. The cascode configuration including transistors M4 and M5 may constitute (or is similar to), for example, the cascode configuration including transistors 91A-91B (see FIG. 5) or transistors 153A-153B (see FIG. 6).

Figure 22:
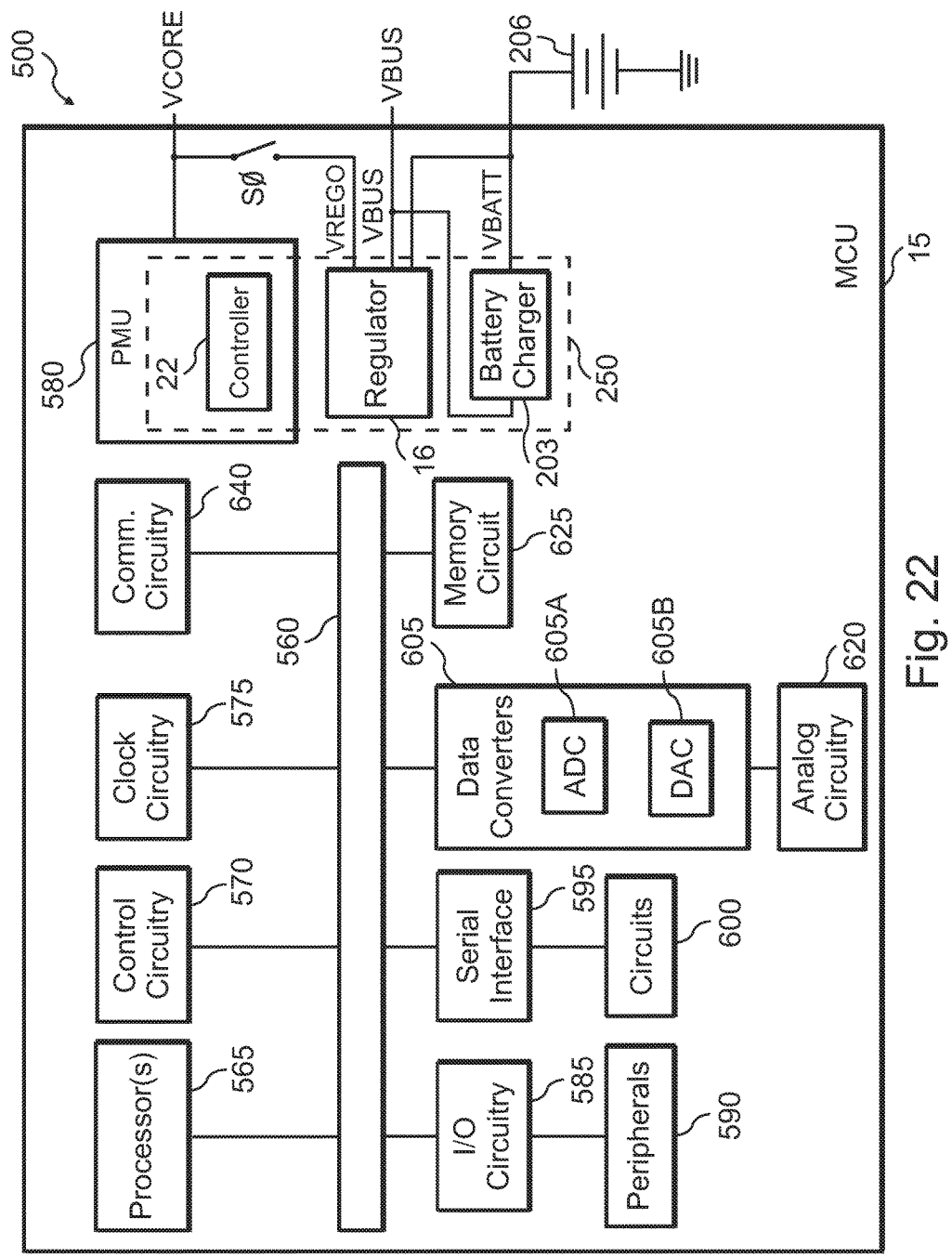
FIG. 22 shows a circuit arrangement that includes an MCU according to an exemplary embodiment.

Another aspect of the disclosure relates to using the power control schemes and voltage regulation techniques described above to power various circuitry in an MCU. FIG. 22 depicts a circuit arrangement 500 that includes an MCU 505, integrated in an IC according to an exemplary embodiment. MCU 505 includes a number of blocks (e.g., processor(s) 565, data converter 605, I/O circuitry 585, etc.) that communicate with one another using a link 560. In exemplary embodiments, link 560 may constitute a coupling mechanism, such as a bus, a set of conductors or semiconductors for communicating information, such as data, commands, status information, and the like.

MCU 505 may include link 560 coupled to one or more processors 565, clock circuitry 575, and power management circuitry or PMU 580. In some embodiments, processor(s) 565 may include circuitry or blocks for providing computing functions, such as central-processing units (CPUs), arithmetic-logic units (ALUs), and the like. In some embodiments, in addition, or as an alternative, processor(s) 565 may include one or more digital signal processors (DSPs). The DSPs may provide a variety of signal processing functions, such as arithmetic functions, filtering, delay blocks, and the like, as desired. Clock circuitry 575 may generate one or more clock signals that facilitate or control the timing of operations of one or more blocks in MCU 505. Clock circuitry 575 may also control the timing of operations that use link 560. In some embodiments, clock circuitry 575 may provide one or more clock signals via link 560 to other blocks in MCU 505.

In some embodiments, PMU 580 may reduce an apparatus's (e.g., MCU 505) clock speed, turn off the clock, reduce power, turn off power, or any combination of the foregoing with respect to part of a circuit or all components of a circuit. Further, PMU 580 may turn on a clock, increase a clock rate, turn on power (e.g., using controller 22, as described above), increase power, or any combination of the foregoing in response to a transition from an inactive state to an active state (such as when processor(s) 565 make a transition from a low-power or idle or sleep state to a normal operating state), support various processor power modes (e.g., as described above), etc. In the embodiment shown, PMU 580 includes controller 22. Controller 22 couples to and controls battery charger 13 (if used) and regulator 16, described above in detail. Note that in some embodiments, battery charger 13 and/or regulator 16 may be included in PMU 580, as desired. In the exemplary embodiment shown, switch S0 couples VCORE to VREGO. Other arrangements in other embodiments are contemplated, such as those described in this document. Battery charger 203, if used, may be coupled in alternative configurations, as described above. The load, denoted as other circuitry 19 above, may include or may constitute some or all of the circuitry in MCU 505 (other than controller 22, regulator 16, and battery charger 203, which facilitate the provision of power to other circuits in MCU 505), one or more circuits external to MCU 505, etc. Furthermore, note that circuit arrangement 250 may include switch S0 (not shown; see FIGS. 11 and 13) as either internal to MCU 505, or external to MCU 505, as desired. In addition, in some embodiments, rather than using PMU 580, circuit arrangement 250 (e.g., a power controller, as described above) may be used in MCU 505.

Referring again to FIG. 8, link 560 may couple to one or more circuits 600 through serial interface 595. Through serial interface 595, one or more circuits coupled to link 560 may communicate with circuits 600. Circuits 600 may communicate using one or more serial protocols, e.g., SMBUS, I²C, SPI, and the like, as person of ordinary skill in the art will understand. Link 560 may couple to one or more peripherals 590 through I/O circuitry 585. Through I/O circuitry 585, one or more peripherals 590 may couple to link 560 and may therefore communicate with other blocks coupled to link 560, e.g., processor(s) 365, memory circuit 625, etc. In exemplary embodiments, peripherals 590 may include a variety of circuitry, blocks, and the like. Examples include I/O devices (keypads, keyboards, speakers, display devices, storage devices, timers, etc.). Note that in some embodiments, some peripherals 590 may be external to MCU 505. Examples include keypads, speakers, and the like. In some embodiments, with respect to some peripherals, I/O circuitry 585 may be bypassed. In such embodiments, some peripherals 590 may couple to and communicate with link 560 without using I/O circuitry 585. Note that in some embodiments, such peripherals may be external to MCU 505, as described above.

Link 560 may couple to analog circuitry 620 via data converter 605. Data converter 405 may include one or more ADCs 605B and/or one or more DACs 605A. The ADC(s) 615 receive analog signal(s) from analog circuitry 620, and convert the analog signal(s) to a digital format, which they communicate to one or more blocks coupled to link 560. Analog circuitry 620 may include a wide variety of circuitry that provides and/or receives analog signals. Examples include sensors, transducers, and the like, as person of ordinary skill in the art will understand. In some embodiments, analog circuitry 620 may communicate with circuitry external to MCU 505 to form more complex systems, sub-systems, control blocks, and information processing blocks, as desired. Control circuitry 570 couples to link 560. Thus, control circuitry 570 may communicate with and/or control the operation of various blocks coupled to link 560. In addition, control circuitry 570 may facilitate communication or cooperation between various blocks coupled to link 560. In some embodiments, control circuitry 570 may initiate or respond to a reset operation. The reset operation may cause a reset of one or more blocks coupled to link 560, of MCU 505, etc., as person of ordinary skill in the art will understand. For example, control circuitry 570 may cause PMU 580 (and thus controller 22) to reset to an initial state. PMU 580 (more specifically, circuit arrangement 250) may provide a reset signal to core circuitry of MCU 505. The core circuitry of MCU 505, corresponding to core 19 in FIG. 13, may include one or more blocks of circuitry in FIG. 22, such as processor(s) 565, clock circuitry 575, memory circuitry 625, etc.

In exemplary embodiments, control circuitry 570 may include a variety of types and blocks of circuitry, similar to controller 22, described above. Referring again to FIG. 22, in some embodiments, control circuitry 570 may include logic circuitry, FSMs, or other circuitry to perform a variety of operations, such as the operations described above, as desired. Communication circuitry 640 couples to link 560 and also to circuitry or blocks (not shown) external to MCU 505. Through communication circuitry 640, various blocks coupled to link 560 (or MCU 505, generally) can communicate with the external circuitry or blocks (not shown) via one or more communication protocols. Examples include USB, Ethernet, and the like. In exemplary embodiments, other communication protocols may be used, depending on factors such as specifications for a given application, as person of ordinary skill in the art will understand.

As noted, memory circuit 625 couples to link 560. Consequently, memory circuit 625 may communicate with one or more blocks coupled to link 560, such as processor(s) 365, control circuitry 570, I/O circuitry 585, etc. Memory circuit 625 provides storage for various information or data in MCU 505, such as operands, flags, data, instructions, and the like, as persons of ordinary skill in the art will understand. Memory circuit 625 may support various protocols, such as double data rate (DDR), DDR2, DDR3, and the like, as desired. In some embodiments, the memory read and/or write operations involve the use of one or more blocks in MCU 505, such as processor(s) 565. A direct memory access (DMA) arrangement (not shown) allows increased performance of memory operations in some situations. More specifically, the DMA (not shown) provides a mechanism for performing memory read and write operations directly between the source or destination of the data and memory circuit 625, rather than through blocks such as processor(s) 565.

Although the above description relates to MCUs, as persons of ordinary skill in the art will understand, one may apply the disclosed concepts effectively to various types of electronic circuitry or IC (e.g., IC 13), as desired by making appropriate modifications. Examples of such circuitry or ICs include mixed-signal ICs, processors, CPUs, microprocessors, memory controllers, I/O controllers, signal processors, DSPs, and the like.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus, comprising:
   an integrated circuit (IC), comprising:
   a power controller comprising:
   a regulator comprising a plurality of voltage regulators coupled to receive a plurality of input voltages and to provide a regulated output voltage; and
   a controller to control the regulator to generate the regulated output voltage from the plurality of input voltages;
   wherein the power controller provides power to a load integrated in the IC from a set of arbitrary input voltages, the set of arbitrary input voltages comprising the plurality of input voltages.

2. The apparatus according to claim 1, wherein the load integrated in the IC comprises a core circuit of the IC.

3. The apparatus according to claim 2, wherein the set of arbitrary input voltages further includes a voltage received from a source external to the IC.

4. The apparatus according to claim 3, wherein the voltage received from the source external to the IC selectively provides power to the core circuit under control of the power controller.

5. The apparatus according to claim 1, wherein the power controller comprises circuitry in a plurality of power domains.

6. The apparatus according to claim 5, wherein the power controller further comprises a plurality of level shifters to facilitate communication among circuitry in the plurality of power domains.

7. The apparatus according to claim 6, wherein the power controller further comprises a plurality of power on circuits to sequence provision of power to circuitry in the plurality of power domains.

8. The apparatus according to claim 1, wherein at least one voltage regulator in the plurality of voltage regulators comprises a cascode configuration including first and second transistors, and wherein the IC further comprises a bias circuit to provide a bias signal to the second transistor.

9. An apparatus, comprising:
   a microcontroller unit (MCU), comprising:
   a power controller comprising:
   a regulator comprising a plurality of voltage regulators to receive a plurality of input voltages and to provide a regulated output voltage; and
   a controller to control the regulator to generate the regulated output voltage from the plurality of input voltages;
   wherein the power controller sequences provision of power to circuitry in the MCU to power up a core circuit of the MCU.

10. The apparatus according to claim 9, wherein the power controller sequences provision of power to circuitry in the MCU from a set of arbitrary input voltages.

11. The apparatus according to claim 10, wherein the set of arbitrary input voltages comprises plurality of input voltages and a voltage received from a source external to the MCU.

12. The apparatus according to claim 11, wherein the voltage received from the source external to the IC selectively provides power to the core circuit under control of the power controller.

13. The apparatus according to claim 9, wherein once the core circuit is powered up, the core circuit provides control signals to the controller.

14. A method of providing power to circuitry in an integrated circuit (IC), the method comprising:
   receiving a plurality of input voltages in a regulator;
   controlling the regulator to generate the regulated output voltage from the plurality of input voltages by controlling a plurality of voltage regulators included in the regulator to receive the plurality of input voltages and provide the regulated output voltage; and
   providing power to a load integrated in the IC from a set of arbitrary input voltages, the set of arbitrary input voltages comprising the plurality of input voltages.

15. The method according to claim 14, wherein providing power to the load integrated in the IC further comprises providing power to a core circuit of the IC.

16. The method according to claim 15, wherein the set of arbitrary input voltages further includes a voltage received from a source external to the IC.

17. The method according to claim 16, further comprising selectively providing power to the core circuit from the voltage received from the source external to the IC.

18. The method according to claim 14, wherein circuitry in the IC comprises circuitry in a plurality of power domains, and wherein the load is included in a power domain in the plurality of power domains.

19. The method according to claim 14, wherein controlling the regulator to generate the regulated output voltage from the plurality of input voltages further comprises using a plurality of level shifters to facilitate communication among circuitry in a plurality of power domains.

* * * * *